(12) United States Patent
Gregory

(10) Patent No.: US 11,079,041 B2
(45) Date of Patent: *Aug. 3, 2021

(54) PIPELINE RETAINER STAKE SYSTEMS AND METHODS

(71) Applicant: Trinity Bay Equipment Holdings, LLC, Houston, TX (US)

(72) Inventor: David Michael Gregory, Houston, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/000,487

(22) Filed: Aug. 24, 2020

(65) Prior Publication Data

US 2021/0190235 A1 Jun. 24, 2021

Related U.S. Application Data

(63) Continuation of application No. 16/719,535, filed on Dec. 18, 2019, now Pat. No. 10,781,941.

(51) Int. Cl.
*F16L 1/06* (2006.01)

(52) U.S. Cl.
CPC ................................... *F16L 1/06* (2013.01)

(58) Field of Classification Search
CPC ....... F16L 3/04; F16L 1/06; F16L 3/00; F16L 3/01; F16L 3/02
See application file for complete search history.

(56) References Cited

U.S. PATENT DOCUMENTS

| 2,864,633 | A | * | 12/1958 | Mackie | F16L 3/04 52/127.5 |
| 3,499,359 | A | * | 3/1970 | Yrjanainen | F16L 3/04 411/451.3 |
| 3,810,364 | A | | 3/1974 | Johnson | |
| 4,948,293 | A | | 8/1990 | Smith | |

(Continued)

FOREIGN PATENT DOCUMENTS

| EP | 1248047 | * | 10/2002 |
| EP | 2474765 B1 | | 4/2014 |

OTHER PUBLICATIONS

International Search Report and Written Opinion for PCT/US20/66197 dated Mar. 29, 2021.

*Primary Examiner* — Carib A Oquendo
(74) *Attorney, Agent, or Firm* — Conrad J. Hsu

(57) ABSTRACT

Techniques for implementing a pipeline system that includes a pipe segment deployed on an inclined surface, in which the pipe segment includes tubing that defines a bore and a fluid conduit implemented in an annulus of the tubing, a pipe fitting secured to the pipe segment, and a pipeline retainer stake. The pipeline retainer stake includes a stake body, in which the stake body includes a pipeline engaging portion and one or more stake legs used to engage ground proximate the pipeline system, and a pipeline engaging component implemented on an inner surface of the pipeline engaging portion of the stake body, in which the pipeline engaging component engages the pipeline system to facilitate offsetting a parallel force resulting from deployment on the inclined surface at least in part by facilitating transfer of the parallel force from the pipeline system to the ground via the pipeline retainer stake.

14 Claims, 9 Drawing Sheets

(56) References Cited

U.S. PATENT DOCUMENTS

| | | |
|---|---|---|
| 5,242,247 A | 9/1993 | Murphy |
| 5,405,176 A | 4/1995 | Babel et al. |
| 5,690,148 A | 11/1997 | Ziu |
| 6,132,141 A | 10/2000 | Kirk |
| 6,527,246 B1 | 3/2003 | Stinnett |
| 6,907,716 B2 | 6/2005 | Cinotti et al. |
| 2003/0021655 A1 | 1/2003 | Correll et al. |
| 2008/0202185 A1 | 8/2008 | Dole |
| 2011/0041934 A1 | 2/2011 | Holler |
| 2018/0172052 A1 | 7/2018 | Gray |

\* cited by examiner

PIPELINE RETAINER STAKE SYSTEMS AND METHODS

CROSS-REFERENCE

The present disclosure is a continuation of U.S. patent application Ser. No. 16/719,535, entitled "PIPELINE RETAINER STAKE SYSTEMS AND METHODS" and filed on Dec. 18, 2019, which is incorporated herein by reference in its entirety for all purposes.

BACKGROUND

The present disclosure generally relates to pipeline systems and, more particularly, to a pipeline retainer stake that may be coupled (e.g., secured) to a pipeline system.

Pipeline systems are often implemented and/or operated to facilitate transporting (e.g., conveying) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, fresh water, fracturing fluid, flowback fluid, carbon dioxide, or any combination thereof.

To facilitate transporting fluid, a pipeline system may include one or more pipe segments in addition to one or more pipe (e.g., midline and/or end) fittings (e.g., connectors), for example, used to couple a pipe segment to another pipe segment, to a fluid source, and/or to a fluid destination. Generally, a pipe segment may include a tubing, which defines (e.g., encloses) a bore that provides a primary fluid conveyance (e.g., flow) path through the pipe segment. More specifically, the tubing of a pipe segment may be implemented to facilitate isolating (e.g., insulating) fluid being conveyed within its bore from environmental conditions external to the pipe segment, for example, to reduce the likelihood of the conveyed (e.g., bore) fluid being lost to the external environmental conditions and/or the external environmental conditions contaminating the conveyed fluid.

Additionally, in some instances, at least a portion of a pipeline system (e.g., one or more pipe segments and/or one or more pipe fittings) may be deployed on an inclined surface, such as the side of a hill or the side of a valley. However, in some such instances, the parallel force that acts on a pipeline system due to deployment on an inclined surface may stress the tubing of one or more of its pipe segments and, thus, potentially affect (e.g., reduce) its life span and/or its ability to provide isolation, for example, due to the parallel force acting (e.g., attempting) to pull a pipeline component deployed lower on the inclined surface away from pipe segment tubing deployed higher on the inclined surface. In other words, at least in some instances, deploying a pipeline system at least in part on an inclined surface may potentially affect (e.g., reduce) operational reliability and/or operational efficiency of the pipeline system, for example, due to the added stress producing a defect, such as a breach, in pipe segment tubing that results in conveyed fluid being lost and/or contaminated by external environmental conditions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a pipeline system includes a pipe segment deployed at least in part on an inclined surface, in which the pipe segment includes tubing that defines a bore and a fluid conduit implemented in an annulus of the tubing, a pipe fitting secured to the pipe segment, and a pipeline retainer stake. The pipeline retainer stake includes a stake body, in which the stake body includes a pipeline engaging portion and one or more stake legs used to engage ground proximate the pipeline system, and a pipeline engaging component implemented on an inner surface of the pipeline engaging portion of the stake body, in which the pipeline engaging component engages the pipeline system to facilitate offsetting a parallel force resulting from deployment on the inclined surface at least in part by facilitating transfer of the parallel force from the pipeline system to the ground proximate the pipeline system via the pipeline retainer stake.

In another embodiment, a method of implementing a pipeline system includes deploying a portion of the pipeline system at least partially on an inclined surface, in which the portion of the pipeline system includes a pipe segment, a pipe fitting, or both, and implementing a retainer stake to be deployed in the portion of the pipeline system at least in part by implementing a stake body that includes a pipeline engaging portion and one or more stake legs that extend from the pipeline engaging portion of the stake body. Additionally, the method includes deploying the retainer stake at least in part by sliding the retainer stake onto a pipeline component in the portion of the pipeline system such that the pipeline engaging portion of the stake body at least partially covers the portion of the pipeline system and the one or more stake legs of the stake body are at least partially inserted into and engage ground proximate the portion of the pipeline system to facilitate offsetting a parallel force resulting from deployment on the inclined surface at least in part by facilitating transfer of the parallel force from the pipeline system to the ground proximate to the portion of the pipeline system via the retainer stake.

In another embodiment, a retainer stake includes a stake body, which includes a curved portion and a stake leg that extends from the curved portion, in which the curved portion of the stake body at least partially covers the pipe fitting and the stake leg is extends beyond an outer surface of the pipe fitting to engage an environment external to the pipe fitting when the retainer stake is deployed at a pipe fitting. Additionally, the retainer stake includes one or more wing plates that extend out from the stake leg, in which the one or more wing plates engage the environment external to the pipe fitting when the retainer stake is deployed at the pipe fitting, and a stake grab tab that protrudes from an inner surface of the curved portion of the stake body, in which the stake grab tab interlocks with a grab notch on the pipe fitting to facilitate offsetting at least a force exerted on the pipe fitting in an axial direction when the retainer stake is deployed at the pipe fitting.

DETAILED DESCRIPTION

Figure 1:
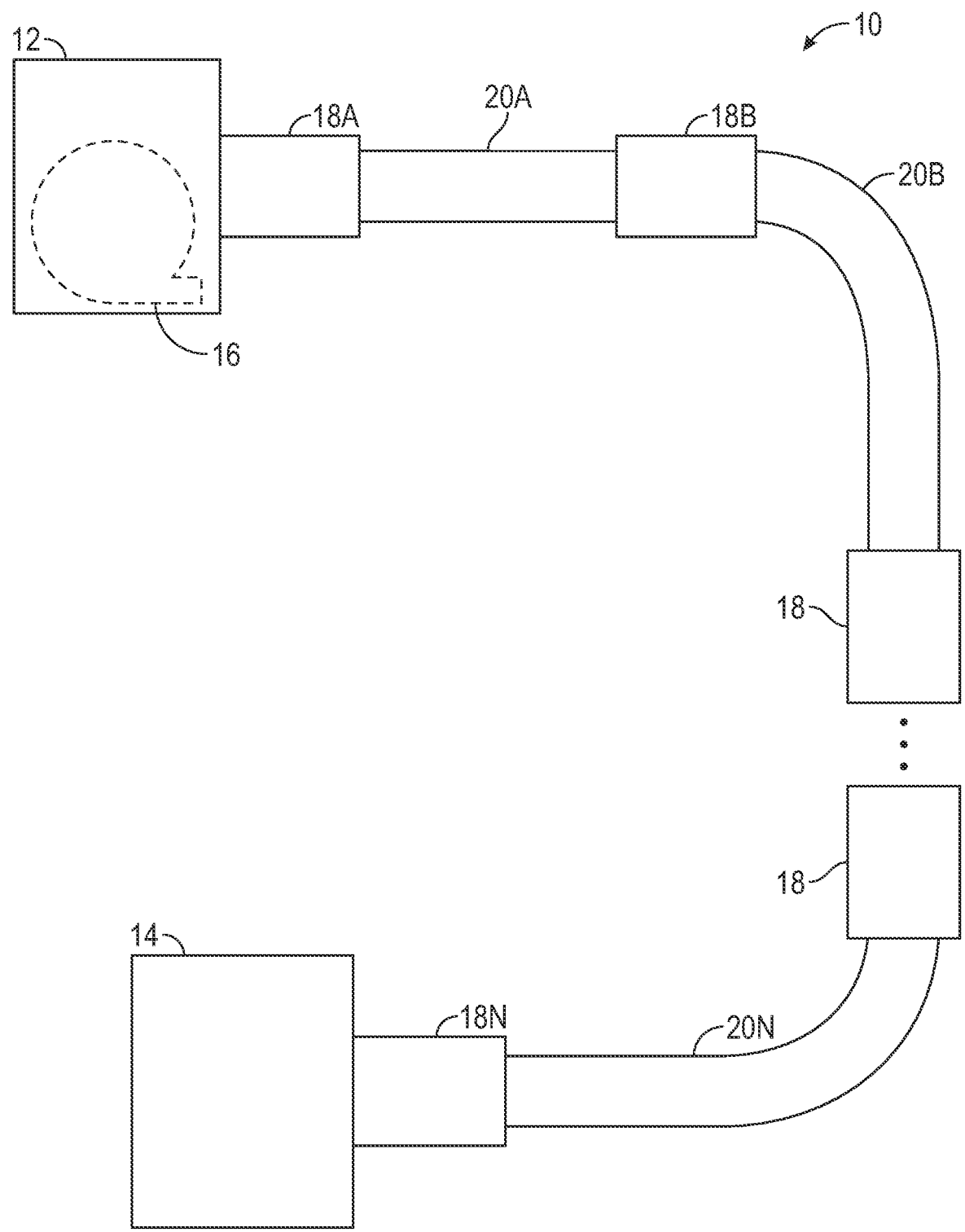
FIG. 1 is a block diagram of an example of a pipeline system including pipe segments and pipe fittings (e.g., connectors), in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings (e.g., connectors), such as a midline pipe fitting and/or a pipe end fitting, and one or more pipe segments, which each includes tubing that defines (e.g., encloses) a corresponding bore. More specifically, the tubing of a pipe segment may be implemented to facilitate isolating environmental conditions external to the pipe segment from conditions within its bore and, thus, fluid that flows therethrough.

Additionally, in some instances, at least a portion of a pipeline system may be deployed (e.g., installed) on an inclined surface, such as the side of a hill or the side of a valley. Merely as an illustrative non-limiting example, moving from the top to the bottom of the inclined surface, the pipeline system may include a first pipe (e.g., end) fitting, a first pipe segment coupled to the first pipe fitting, a second (e.g., midline) pipe fitting coupled to the first pipe segment, a second pipe segment coupled to the second pipe fitting, and a third pipe (e.g., end) fitting coupled to the second pipe segment. However, in some instances, deploying a pipeline system at least in part on an inclined surface may affect (e.g., reduce) its operational reliability and/or operational efficiency, for example, due to resulting parallel forces pulling the pipeline system down the inclined surface and/or adding stress to the tubing of one or more of its pipe segments. To help illustrate, continuing with the above example, forces acting on the junction of the tubing of the first pipe segment to the first pipe fitting may include a parallel force resulting from the weight of the first pipe segment as well as parallel forces resulting from the weight of the second pipe fitting, the weight of the second pipe segment, and the weight of the third pipe fitting and, thus, increase the stress on the tubing of the first pipe segment compared to deployment on a flat surface.

Accordingly, to facilitate improving pipeline operational reliability and/or operational efficiency, the present disclosure provides techniques for implementing and/or deploying a pipeline retainer stake in a pipeline system, for example, which is deployed at least in part on an inclined surface. In particular, as will be described in more detail below, a pipeline retainer stake may be implemented and/or deployed in a pipeline system to facilitate offsetting force, such as a parallel force resulting from deployment on an inclined surface, exerted on the pipeline system. To facilitate offsetting force exerted on a pipeline system, in some embodiments, the body of a pipeline retainer stake may include a pipeline engaging portion and an environment (e.g., ground) engaging portion. For example, when implemented with a U-shape, the pipeline engaging portion of the stake body may include a curved (e.g., semi-circular) portion of the stake body and the environment engaging portion of the stake body may include one or more stake legs that extend from the curved portion of the stake body.

In some embodiments, a pipeline retainer stake may be deployed at a pipeline component, such as a pipe segment or a pipe fitting, at least in part by sliding its stake body over the pipeline component such that its pipeline engaging portion wraps at least partially around the pipeline component and one or more of its stake legs engage the environment (e.g., ground) external (adjacent and/or proximate) to the pipeline component. However, in some embodiments, the pipeline engaging portion of a stake body itself may not directly engage (e.g., contact) the pipeline component. For example, to facilitate reducing the likelihood that rubbing between the pipeline retainer stake and a pipeline component affects (e.g., reduces and/or compromises) integrity of the pipeline component, a buffer pad, which is made of a softer material than the base material of its stake body, may be implemented along an inner surface of the stake body.

Additionally or alternatively, a grab tab may be implemented on a pipeline retainer stake such that it extends (e.g., protrudes) out from an inner surface of the stake body. In fact, in some embodiments, the grab tab on a pipeline retainer stake may be implemented and/or deployed such that the grab tab interlocks (e.g., interfaces and/or engages) with a grab notch on a pipe fitting, for example, which may also be used by deployment equipment, such as a swage machine, to secure (e.g., swage) the pipe fitting to a pipe segment. In any case, as will be described in more detail below, deploying a pipeline retainer stake, which has a stake body implemented in this manner, at a pipeline component in a pipeline system may facilitate offsetting forces, such as a parallel force resulting from deployment on an inclined surface, exerted on the pipeline system, for example, at least in part dissipating (e.g., transferring) force exerted on the pipeline component to the environment (e.g., ground) engaged by the pipeline retainer stake via its stake body.

To facilitate improving deployment efficiency, in some embodiments, a pipeline retainer stake may include one or more deployment assistance components, for example, coupled to and/or integrated with its stake body. In particular, in some such embodiments, the pipeline retainer stake may include one or more handles that facilitate moving the pipeline retainer stake to a pipeline system and/or removing (e.g., pulling) the pipeline retainer stake from the pipeline system. Additionally or alternatively, the pipeline retainer stake may include one or more impact plates that facilitate deploying the pipeline retainer stake at a pipeline component, for example, while reducing the likelihood of deployment equipment, such as a sledge hammer, inadvertently contacting the pipeline component while the pipeline retainer stake is being deployed.

Moreover, to facilitate improving its ability to offset exerted forces, in some embodiments, a pipeline retainer stake may include one or more environment (e.g., ground) engaging components, for example, coupled to and/or integrated with an environment engaging portion (e.g., stake leg) of its stake body. In particular, in some such embodiments, the pipeline retainer stake may include one or more wing plates that extend out from one or more of its stake legs. Thus, as will be described in more detail below, implementing and/or deploying a pipeline retainer stake in a pipeline system in accordance with the techniques described in the present disclosure may facilitate improving operational reliability and/or operational efficiency of the pipeline system, for example, at least in part by improving dissipation of force, such as parallel force resulting from deployment on an inclined surface, exerted on the pipeline system and, thus, reducing movement and/or tubing stress resulting from the force exerted on the pipeline system.

To help illustrate, an example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at a bore fluid source 12, for example, when fluid flow through the bore of the pipeline system 10 is produced by gravity. Additionally or alternatively, in other embodiments, one or more bore fluid pumps 16 may be implemented in a pipeline system 10 and/or at a bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer (e.g., one) pipe segments 20. Additionally or alternatively, in other embodiments, a pipeline system 10 may include fewer (e.g., two) pipe fittings 18.

In any case, as described above, a pipe segment 20 generally includes tubing that may be used to convey or transfer (e.g., transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving flexibility, in some embodiments, the tubing of a pipe segment 20 that defines (e.g., encloses) its bore may include one or more openings devoid of solid material. In fact, in some embodiments, an opening in the tubing of a pipe segment 20 may run (e.g., span) the length of the pipe segment 20 and, thus, define (e.g., enclose) a fluid conduit in the annulus of the tubing, which is separate from the pipe segment bore. In other words, in such embodiments, fluid may flow through a pipe segment 20 via its bore, a fluid conduit implemented within its tubing annulus, or both.

Figure 2:
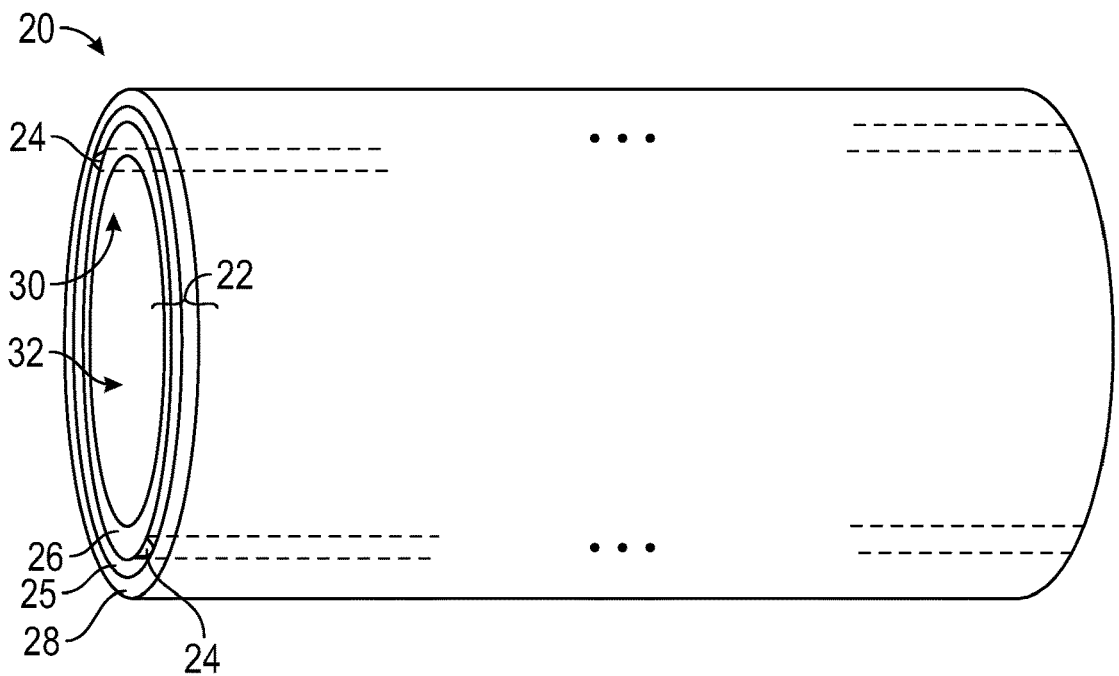
FIG. 2 is a side view of an example of a pipe segment of FIG. 1 that includes a bore defined by its tubing as well as fluid conduits implemented within an annulus of its tubing, in accordance with an embodiment of the present disclosure.

To help illustrate, an example of a pipe segment 20, which includes a tubing 22 with fluid conduits 24 implemented in its annulus 25, is shown in FIG. 2. As depicted, the pipe segment tubing 22 is implemented with multiple layers including an inner (e.g., innermost) layer 26 and an outer (e.g., outermost) layer 28. In some embodiments, the inner layer 26 and/or the outer layer 28 of the pipe segment tubing 22 may be implemented using composite material and/or plastic, such as high-density polyethylene (HDPE) and/or raised temperature polyethylene (PE-RT). In any case, as depicted an inner surface 30 of the inner layer 26 defines (e.g., encloses) a bore 32 through which fluid can flow, for example, to facilitate transporting the fluid from a bore fluid source 12 to a bore fluid destination 14.

Additionally, as depicted, the annulus 25 of the pipe segment tubing 22 is implemented between its inner layer 26 and its outer layer 28. As will be described in more detail below, the tubing annulus 25 may include one or more intermediate layer of the pipe segment tubing 22. Furthermore, as depicted, fluid conduits 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 therein may include less solid material and, thus, exert less resistance to flexure, for example, compared to solid pipe segment tubing 22 and/or pipe segment tubing 22 that does not include fluid conduits 24 implemented therein. Moreover, to facilitate further improving flexibility, in some embodiments, one or more layers in the tubing 22 of a pipe segment 20 may be unbonded from one or more other layers in the tubing 22 and, thus, the pipe segment 20 may be an unbonded pipe segment 20.

However, it should be appreciated that the depicted example is merely intended to be illustrative and not limiting. In particular, in other embodiments, pipe segment tubing 22 may include fewer (e.g., one) or more (e.g., three, four, or more) fluid conduits 24 defined in its tubing annulus 25. Additionally or alternatively, in other embodiments, a fluid conduit 24 defined in the tubing annulus 25 of a pipe segment 20 may run non-parallel to the bore 32 of the pipe segment 20, for example, such that the fluid conduit 24 is skewed relative to the axial (e.g., longitudinal) extent of the bore 32.

Figure 3:
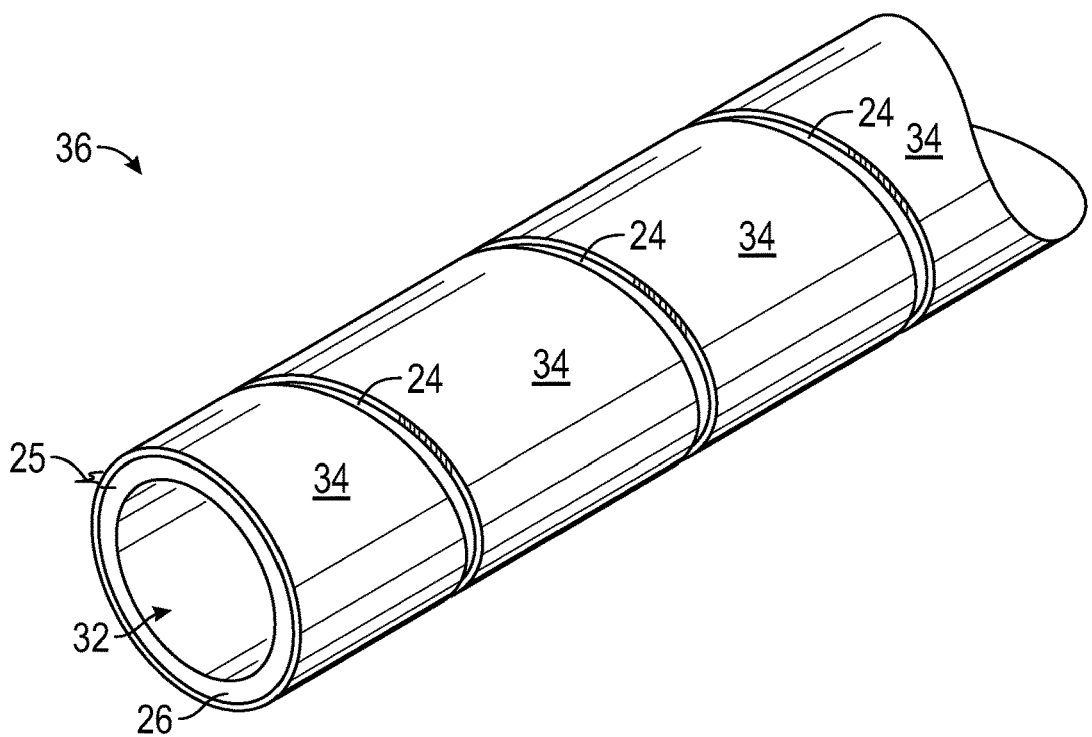
FIG. 3 is a perspective view of an example of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an inner layer 26 and an intermediate layer 34 included in the annulus 25 of its pipe segment tubing 22, is shown in FIG. 3. In some embodiments, one or more intermediate layers 34 of pipe segment tubing 22 may be implemented using composite material and/or metal, such as carbon steel, stainless steel, duplex stainless steel, super duplex stainless steel, or any combination thereof. In other words, at least in some such embodiments, the intermediate layer 34 of the pipe segment tubing 22 may be implemented using electrically conductive, which, at least in some instances, may enable communication of electrical (e.g., control and/or sensor) signals via the intermediate layer 34.

In any case, as depicted, the intermediate layer 34 is helically disposed (e.g., wound and/or wrapped) on the inner layer 26 such that gaps (e.g., openings) are left between adjacent windings to define a fluid conduit 24. In other words, in some embodiments, the intermediate layer 34 may be implemented at least in part by winding a metal (e.g., steel) strip around the inner layer 26 at a non-zero lay angle (e.g., fifty-four degrees) relative to the axial (e.g., longitudinal) extent of the bore 32. In any case, as depicted, the resulting fluid conduit 24 runs helically along the pipe segment 20, for example, such that the fluid conduit 24 is skewed fifty-four degrees relative to the axial extent of the pipe segment bore 32.

In some embodiments, an outer layer 28 may be disposed directly over the depicted intermediate layer 34 and, thus, cover and/or define (e.g., enclose) the depicted fluid conduit 24. However, in other embodiments, the tubing annulus 25 pipe segment tubing 22 may include multiple (e.g., two, three, or four) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that gaps are left between adjacent windings to implement one or more corresponding fluid conduits 24 in the pipe segment tubing 22.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer layer 28 may be disposed over the third other intermediate layer 34 and, thus, cover (e.g., define and/or enclose) the other fluid conduit 24 in the third other intermediate layer 34.

Figure 4:
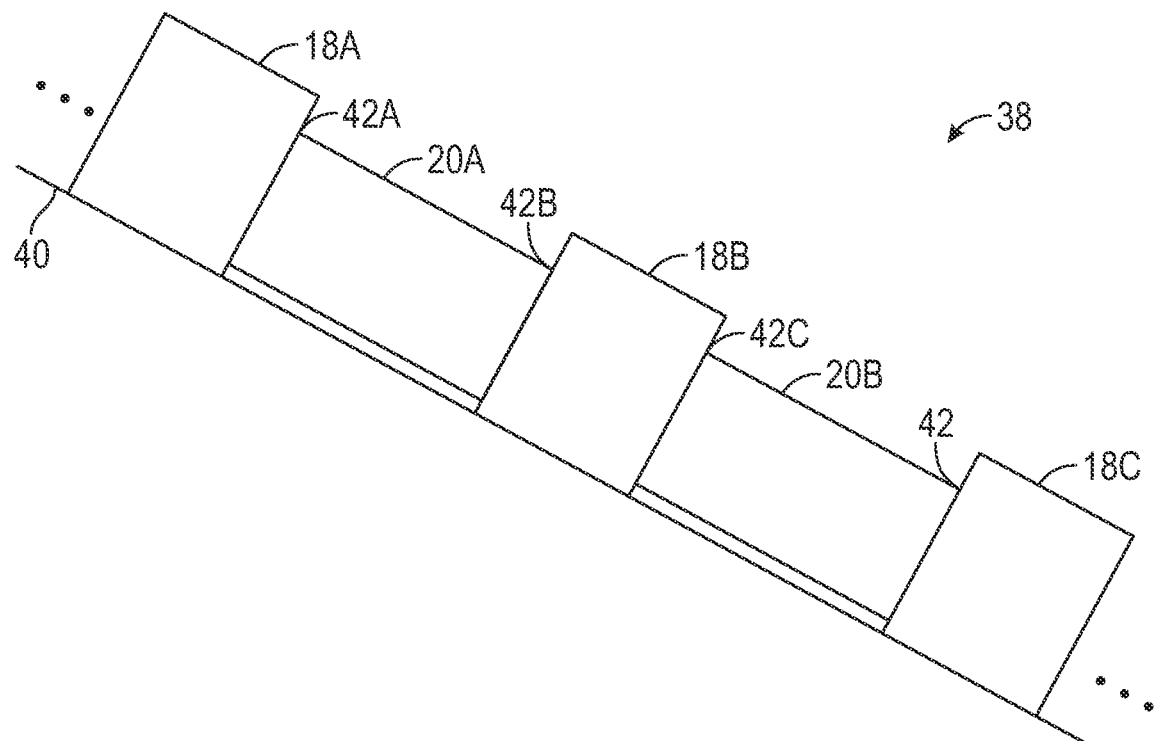
FIG. 4 is a block diagram of an example of a portion of the pipeline system of FIG. 1 deployed on an inclined surface, in accordance with an embodiment of the present disclosure.

In any case, as described above, in some instances, at least a portion of a pipeline system 10 may be deployed on an inclined surface, such as the side of a hill or the side of a valley. To help illustrate, an example of a portion 38 of a pipeline system 10, which is deployed on an inclined surface (e.g., plane) 40, is shown in FIG. 4. As depicted, the portion 38 of the pipeline system 10 includes a first pipe fitting 18A, a first pipe segment 20A, a second pipe fitting 18B, a second pipe segment 20B, and a third pipe fitting 18C deployed along the slope of the inclined surface 40.

However, it should be appreciated that the depicted example is merely intended to illustrative and not limiting. In particular, in other embodiments, a pipeline system 10 may include fewer than two (e.g., one) or more than two (e.g., three, four, or more) pipe segments 20 deployed on an inclined surface 40. Additionally or alternatively, a pipeline system 10 may include fewer than three (e.g., one or two) or more than three (e.g., four, five, or more) pipe fittings 18 deployed on an inclined surface 40. Furthermore, in other embodiments, at least a portion of a pipeline system 10 may be additionally or alternatively be deployed transverse (e.g., into the page) to the slope of an inclined surface 40.

In any case, with regard to the depicted example, the first pipe fitting 18A is coupled to the first pipe segment 20A, which is deployed lower on the inclined surface 40 than the first pipe fitting 18A. Additionally, as depicted, the first pipe segment 20A is coupled to the second pipe fitting 18B, which is deployed lower on the inclined surface 40 than the first pipe segment 20A. Furthermore, as depicted, the second pipe fitting 18B is coupled to the second pipe segment 20B, which is deployed lower on the inclined surface 40 than the second pipe fitting 18B. Moreover, as depicted, the second pipe segment 20B is coupled to the third pipe fitting 18C, which is deployed lower on the inclined surface 40 than the second pipe segment 20B.

As such, when not otherwise offset (e.g., dissipated), the weight of the third pipe fitting 18C may produce a parallel force, which is parallel to and oriented down the slope of the inclined surface 40, that acts on the second pipe segment 20B. Similarly, when not otherwise offset, the weight of the third pipe fitting 18C may produce a parallel force, which is parallel to and oriented down the slope of the inclined surface 40, that acts on the second pipe segment 20B, the weight of the second pipe segment 20B may produce a parallel force, which is parallel to and oriented down the slope of the inclined surface 40, that acts on the second pipe fitting 18B, and so on. In other words, the parallel forces resulting from the weight of pipeline components, such as pipe fittings 18 and pipe segments 20, deployed on the inclined surface 40 may attempt to pull the pipeline system 10 down the inclined surface 40. In fact, when not sufficiently offset, the parallel forces may actually cause the pipeline line system 10 to move (e.g., slide and/or roll) down the inclined surface 40, which, at least in some instances, may affect (e.g., reduce) operational reliability and/or operational efficiency of the pipeline system 10, for example, due the movement stressing (e.g., disrupting and/or deforming) the tubing 22 of a pipe segment 20 and/or a junction 42 between the pipe segment 20 and a pipe fitting 18 deployed therein.

In some embodiments, a pipeline system 10 may be anchored to resist movement at least in part by a portion of the pipeline system 10 deployed on a relatively (e.g., substantially) flat surface, for example, due to the weight of pipeline components deployed on the flat surface resulting in minimal parallel forces. In other words, in such embodiments, the depicted portion of the pipeline system 10 may be anchored at least in part by a portion of the pipeline system 10 that is coupled to the first pipe fitting 18A and deployed on a relatively flat surface. Additionally or alternatively, the depicted portion of the pipeline system 10 may be anchored at least in part by a portion of the pipeline system 10 that is coupled to the third pipe fitting 18C and deployed on a relatively flat surface.

However, even when a pipeline system 10 is sufficiently anchored to resist substantial movement, at least in some instances, the parallel forces resulting from deployment on an inclined surface 40 may nevertheless stress pipeline components deployed therein, such as the tubing 22 of a pipe segment 20 and/or a junction 42 between the pipe segment 20 and a pipe fitting 18. In fact, at least in some instances, the parallel forces may be unevenly distributed and, thus, result in an uneven distribution of stress between pipeline components. In particular, in some such instances, pipeline components deployed higher on an inclined surface 40 may experience more stress than pipeline components deployed lower on the inclined surface 40, for example, due the parallel forces acting on a pipeline component that is deployed higher on the including surface 40 including the parallel force resulting form its own weight as well as a non-offset portion of the parallel force resulting from the weight of one or more pipeline components deployed lower on the inclined surface 40.

In other words, with regard to the depicted example, deployment on the inclined surface 40 may result in more stress being placed on a first junction 42A between the first pipe fitting 18A and the first pipe segment 20A than a second junction 42B between the first pipe segment 20A and the second pipe fitting 18B, for example, due to the parallel force acting on the first junction 42A including a contribution from the weight of at least one more pipe segment 20 than the parallel force acting on the second junction 42B. Similarly, deployment on the inclined surface 40 may result in more stress being placed on the second junction 42B between the first pipe segment 20A and the second pipe fitting 18B than a third junction 42C between the second pipe fitting 18B and the second pipe segment 20B, for example, due to the parallel force acting on the second junction 42B including a contribution from the weight of at least one more pipe fitting 18 than the parallel force acting on the third junction 42C does not. However, at least in some instances, unevenly distributing stress between pipeline components may affect (e.g., reduce) operational reliability and/or operational efficiency of a pipeline system 10, for example, due to the uneven distribution of stress resulting in some pipeline components wearing out sooner that other pipeline components in the pipeline system 10 and/or sooner than expected.

Accordingly, to facilitate improving pipeline operational efficiency and/or operational reliability, the present disclosure provides techniques for implementing and/or deploying one or more pipeline retainer stakes in a pipeline system 10 to facilitate offsetting forces, such as parallel forces resulting from deployment at least in part on an inclined surface 40, exerted on the pipeline system 10. In particular, as will be described in more detail below, in some embodiments, implementing and/or deploying a pipeline retainer stake in accordance with the techniques of the present disclosure may facilitate reducing the movement of the pipeline system 10 and, thus, resulting stress on one or more pipeline components in the pipeline system 10. Additionally or alternatively, as will be described in more detail below, implementing and/or deploying a pipeline retainer stake in accordance with the techniques of the present disclosure may facilitate distributing forces exerted on the pipeline system 10 and, thus, resulting stress more evenly between pipeline components in the pipeline system 10.

Figure 5:
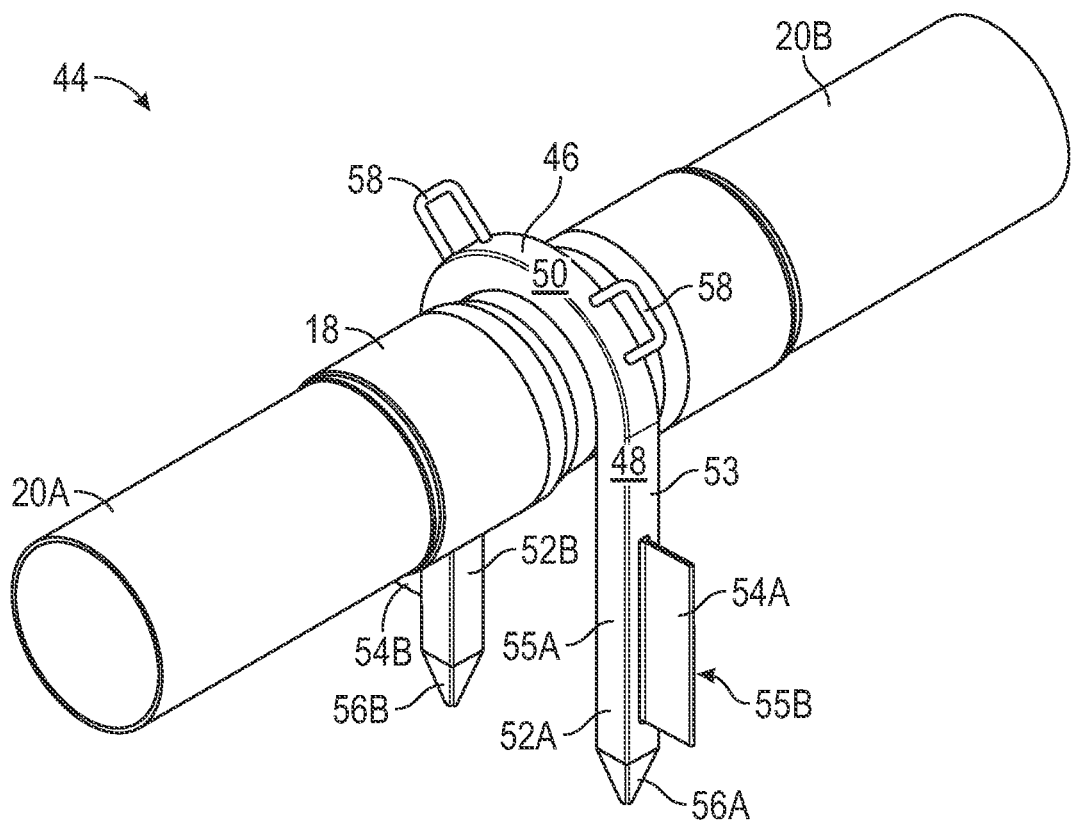
FIG. 5 is a perspective view of an example of a pipeline retainer stake coupled to a portion of the pipeline system of FIG. 1, in accordance with an embodiment of the present disclosure.

To help illustrate, an example of a portion 44 of a pipeline system 10, which includes a pipeline retainer stake 46, is shown in FIG. 5. As depicted, the portion 44 of the pipeline system 10 additionally includes a first pipe segment 20A, a second pipe segment 20B, and a pipe fitting 18. In particular, as depicted, the pipe fitting 18 is coupled between the first pipe segment 20A and the second pipe segment.

In other words, the pipe fitting 18 in FIG. 5 may be a midline pipe fitting 18. However, it should be appreciated that the depicted example is merely intended to be illustrative and not limiting. In particular, in other embodiments, the techniques described in the present disclosure may additionally or alternatively be used with a pipe end fitting 18.

In any case, as depicted, the pipeline retainer stake 46 is deployed at (e.g., coupled to and/or around) the pipe fitting 18. Additionally, as depicted, the pipeline retainer stake 46 includes a stake body 48. As in the depicted example, in some embodiments, the stake body 48 of a pipeline retainer stake 46 may be U-shaped.

However, it should again be appreciated that the depicted example is merely intended to be illustrative and not limiting. In particular, in other embodiments, the stake body 48 of a pipeline retainer stake 46 may implemented with a different shape, such as an L-shape and/or a circular cross-section profile. Additionally or alternatively, as will be described in more detail below, in other embodiments, a pipeline retainer stake 46 may be deployed at (e.g., coupled to and/or around) a pipe segment 20, for example, instead of a pipe fitting 18.

In any case, to facilitate offsetting forces exerted on a pipeline system 10, the stake body 48 of a pipeline retainer stake 46 may generally include a pipeline engaging portion and an environment (e.g., ground) engaging portion. For example, with regard to the depicted example, the pipeline engaging portion may include a curved (e.g., semi-circular) portion 50 of the stake body 48 and the environment (e.g., ground) engaging portion may include the stake legs 52—namely a first stake leg 52A and a second stake leg 52B—that extend from the curved portion 50 of the stake body 48. However, it should again be appreciated that the depicted example is merely intended to be illustrative and not limiting. In particular, in other embodiments, the stake body 48 of a pipeline retainer stake 46 may include a single stake leg 52 or more than two (e.g., three, four, or more) stake legs 52.

In any case, as depicted, a stake leg 52 of the pipeline retainer stake 46 deployed on the pipe fitting 18 extends beyond the surface of the pipe fitting 18. In other words, as will be described in more detail below, in some embodiments, a pipeline retainer stake 46 may be deployed at least in part by sliding the pipeline retainer stake 46 over a pipeline component (e.g., a pipe fitting 18 or a pipe segment 20) such that the pipeline engaging portion (e.g., curved portion 50) of its stake body 48 covers the pipeline component and one or more of its stake legs 52 are inserted into and, thus, engage the environment, such as ground, external (e.g., adjacent and/or proximate) to the pipeline component. Accordingly, force, such as parallel force resulting from deployment on an inclined surface 40, exerted on the pipeline component may be transferred from the pipeline component to the external environment via the pipeline retainer stake 46, which, at least in some instances, may facilitate offsetting the force due to the external environment resisting movement of the pipeline retainer stake 46 therein.

Additionally, as depicted, the pipeline retainer stake 46 includes wing plates 54 coupled to and/or integrated with its stake body 48. In particular, a first wing plate 54A is coupled to and/or integrated with the first stake leg 52A while a second wing plate 54B is coupled to and/or integrated with the second stake leg 52B. As depicted, the wing plates 54 extend out from the stake body 48 and, thus, may facilitate increasing the surface area of the pipeline retainer stake 46 engaged (e.g., in contact) with the external environment and, thus, the security strength provided by the pipeline retainer stake 46.

However, it should again be appreciated that the depicted example is merely intended to be illustrative and not limiting. In particular, in other embodiments, a pipeline retainer stake 46 may not include a wing plate 54 or include more than one (e.g., two, three, or more) wing plate 54 per stake leg 52. Merely as an illustrative non-limiting example, in addition to a wing plate implemented on a radially outward-facing side 53 of a stake leg 52, the pipeline retainer stake 46 may include a wing plate 54 implemented on a first axially-facing side 55A of the stake leg 52 and/or a wing plate 54 implemented on a second (e.g., opposite) axially-facing side 55B of the stake leg 52.

Figure 6:
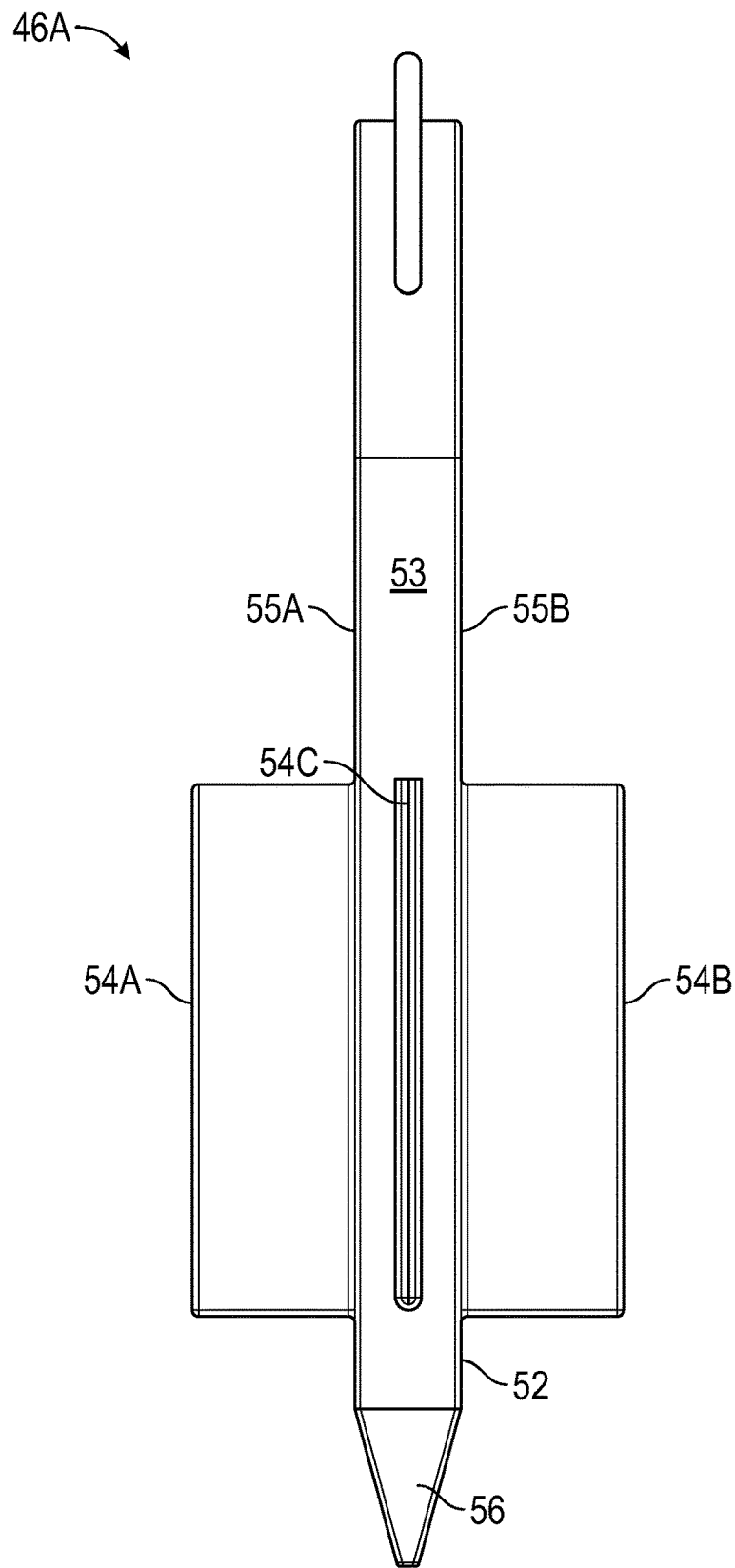
FIG. 6 is a side view of another example of a pipeline retainer stake that includes a stake leg with multiple wing plates, in accordance with an embodiment of the present disclosure.

To help further illustrate, an example of a pipeline retainer stake 46A, which includes multiple wing plates 54 on a stake leg 52, is shown in FIG. 6. As depicted, the pipeline retainer stake 46A includes a first wing plate 54A implemented on a first axially-facing (e.g., left) side 55A of the stake leg 52, a second implemented on a second axially-facing (e.g., right) side 55B of the stake leg 52, and a third wing plate 54C implemented on a radially outward-facing side 53 of the stake leg 52. In other words, in some embodiments, one or more wing plates 54 on a pipeline retainer stake 46 may be implemented orthogonal to another wing plate 54 on the pipeline retainer stake 46.

To facilitate insertion into the external environment, as depicted, the stake leg 52 of the pipeline retainer stake 46A includes a pointed (e.g., sharpened) end 56. In fact, in some embodiments, each stake leg 52 of a pipeline retainer stake 46 may include a pointed end 56. For example, as depicted in FIG. 5, the first stake leg 54A includes a first pointed end 56A and the second stake leg 54B includes a second pointed end 56B. However, it should again be appreciated that the depicted example is merely intended to be illustrative and not limiting. In particular, in other embodiments, one or more stake legs 54 of a pipeline retainer stake 46 may not include a pointed end 56.

Furthermore, as depicted, the pipeline retainer stake 46 includes handles 58 coupled to and/or integrated with its stake body 48. In some embodiments, a handle 58 on the pipeline retainer stake 46 may be implemented and/or used to facilitate transporting the pipeline retainer stake 46 to a deployment location in a pipeline system 10 and/or removing (e.g., pulling out) the pipeline retainer stake 46 from the deployment location in the pipeline system 10. In other words, in such embodiments, the handle 58 may be a deployment assistance component that is coupled to and/or integrated with the stake body 48 of the pipeline retainer stake 46.

However, it should again be appreciated that the depicted example is merely intended to be illustrative and not limiting. In particular, in other embodiments, may include fewer than two (e.g., zero or one) or more than two (e.g., three, four, or more) handles 56. Furthermore, as will be described in more detail below, in other embodiments, the deployment assistance components of a pipeline retainer stake 46 may additionally or alternatively include one or more impact plates, for example, which may be implemented and/or used to facilitate deploying the pipeline retainer stake 46 on a pipeline component while reducing the likelihood of deployment equipment, such as a sledge hammer, inadvertently contacting the pipeline component during deployment of the pipeline retainer stake 46.

In any case, as described above, deploying one or more pipeline retainer stake 46 in a pipeline system 10 may facilitate offsetting force, such as parallel force resulting from deployment on an inclined surface 40, exerted on the pipeline system 10, which, at least in some instances, may facilitate improving operational reliability and/or operational efficiency of the pipeline system 10, for example, at least in part by distributing the forces more evenly between pipeline components and/or reducing the likelihood that the forces cause the pipeline system 10 to move. In other words, as will be described in more detail below, in some embodiments, implementing a pipeline system 10 may include deploying one or more pipeline retainer stakes 46 at corresponding pipeline components in the pipeline system 10. For example, implementing the portion 38 of the pipeline system 10 in FIG. 4 may include deploying a first pipeline retainer stake 46 at (e.g., over and/or around) the first pipe fitting 18A, a second pipeline retainer stake 46 at the second pipe fitting 18B, and a third pipeline retainer stake 46 at the third pipe fitting 18C.

By implementing the portion 38 of the pipeline system 10 in that manner, the pipeline retainer stakes 46 may facilitate anchoring the pipeline system 10 to the inclined surface 40 and, thus, reducing the likelihood that the pipeline system 10 inadvertently moves (e.g., slides and/or rolls) down the inclined surface 40. Moreover, the third pipeline retainer stake 46 at the third pipe fitting 18C may facilitate offsetting the parallel force resulting from its own weight and, thus, reducing the stress it places on pipeline components deployed higher on the inclined surface 40, such as the third junction 42C between the second pipe fitting 18B and the second pipe segment 20B, the second junction 42B between the first pipe segment 20A and the second pipe fitting 18B, and/or the first junction 42A between the first pipe fitting 18A and the first pipe segment 20A. Similarly, the second pipeline retainer 46 at the second pipe fitting 18B may facilitate offsetting the parallel force resulting from its own weight (e.g., as well as the weight of one or more pipeline components deployer lower on the inclined surface) and, thus, reducing the stress it places on pipeline components deployed higher on the inclined surface 40, such as the second junction 42B between the first pipe segment 20A and the second pipe fitting 18B and/or the first junction 42A between the first pipe fitting 18A and the first pipe segment 20A.

Figure 7:
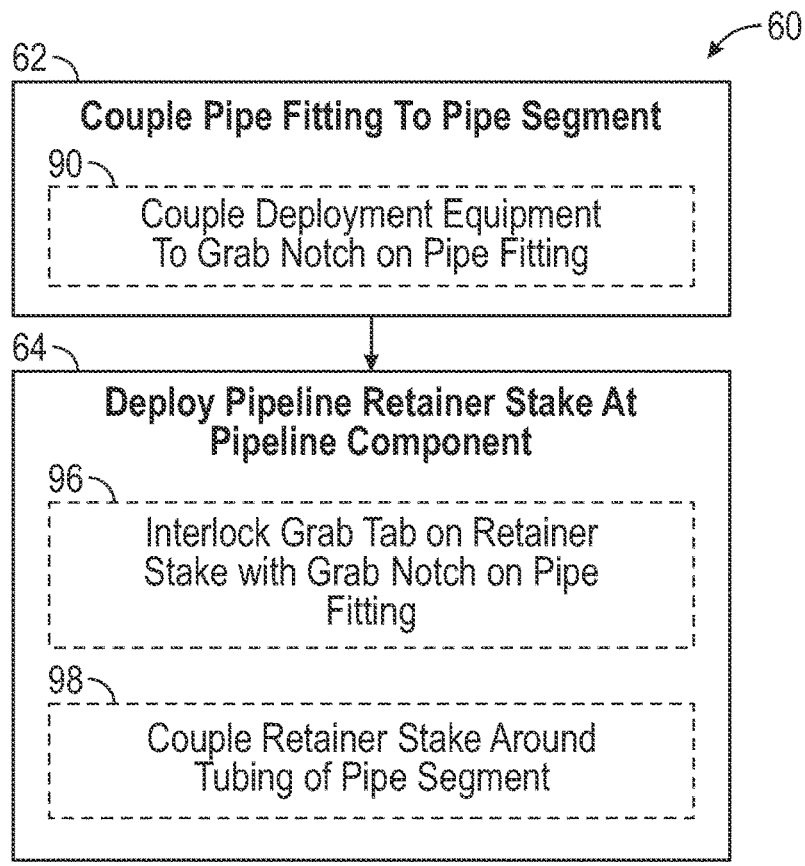
FIG. 7 is a flow diagram of an example process for implementing at least a portion of the pipeline system of FIG. 1, in accordance with an embodiment of the present disclosure.

To help further illustrate, an example of a process 60 for implementing at least a portion of a pipeline system 10 is described in FIG. 7. Generally, the process 60 includes coupling a pipe fitting to a pipe segment (process block 62) and deploying a pipeline retainer stake at a pipeline component (process block 64). Although described in a specific order, which corresponds with an embodiment of the present disclosure, it should be appreciated that the example process 60 is merely intended to be illustrative and non-limiting. In particular, in other embodiments, a process 60 for implementing a pipeline system 10 may include one or more additional process blocks and/or omit one or more of the depicted process blocks.

Figure 8:
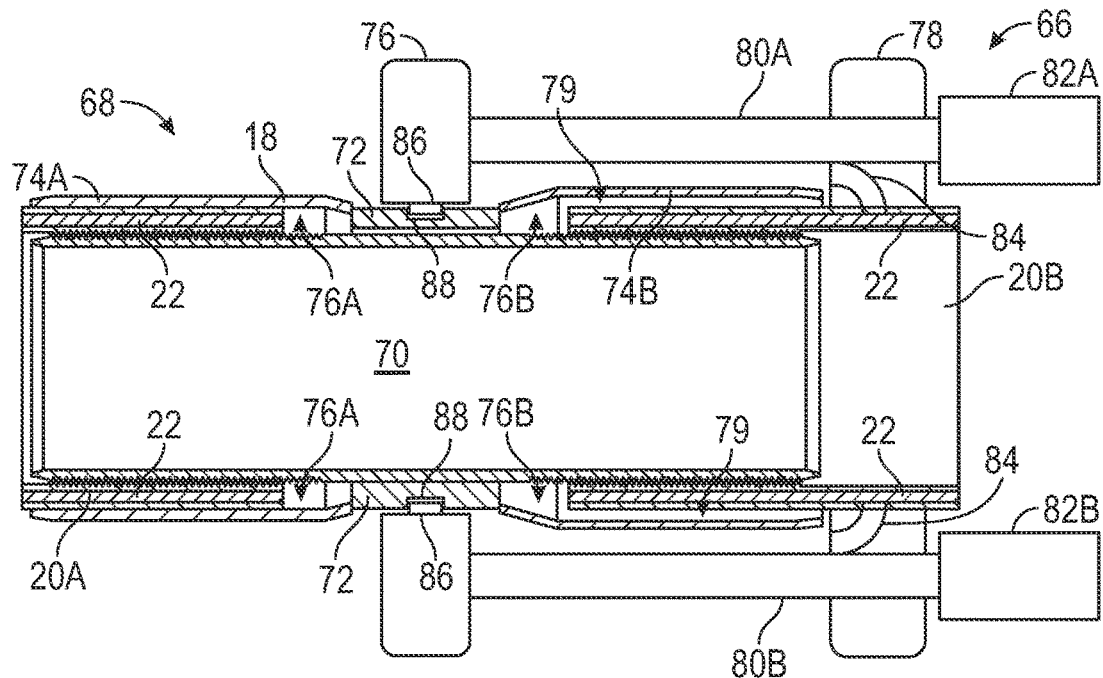
FIG. 8 is a side cross-sectional view of the portion of the pipeline system of FIG. 5 coupled to deployment equipment, in accordance with an embodiment of the present disclosure.

In some embodiments, a pipe fitting 18, such as a midline pipe fitting 18 or a pipe end fitting 18, may be secured (e.g., coupled) to a pipe segment 20 via swaging produced by deployment equipment, such as a swage machine (process block 62). To help illustrate, an example cross-section of deployment equipment 66 coupled to a portion 68 of a pipeline system 10 is shown in FIG. 8. As depicted, the portion 68 of the pipeline system 10 includes a first pipe segment 20A, a second pipe segment 20B, and a pipe fitting 18, which is deployed between the first pipe segment 20A and the second pipe segment 20B.

In other words, the pipe fitting 18 in FIG. 8 may be a midline pipe fitting 18. However, it should be appreciated that the depicted example is merely intended to be illustrative and not limiting. In particular, in other embodiments, the techniques described in the present disclosure may additionally or alternatively be used with a pipe end fitting 18.

In any case, as depicted, the pipe fitting 18 in FIG. 8 includes an inner tube 70 and a grab ring 72 implemented around the inner tube 70. Additionally, as depicted, the pipe fitting 18 includes outer jackets 74—namely a first outer jacket 74A and a second outer jacket 74B—coupled to the grab ring 72 to define (e.g., enclose) corresponding tubing cavities 76. In particular, as depicted, the tubing 22 of the first pipe segment 20A is disposed in a first tubing cavity 76A, which is defined by an outer surface of the inner tube 70 and an inner surface of the first outer jacket 74A. Similarly, the tubing 22 of the second pipe segment 20B is disposed in a second tubing cavity 76B, which is defined by an outer surface of the inner tube 70 and an inner surface of the second outer jacket 74B.

However, as depicted, open space 79 is present between the tubing 22 of the second pipe segment 20B and the pipe fitting 18 whereas minimal open space is present between the tubing 22 of the first pipe segment 20A and the pipe fitting 18. In other words, the pipe fitting 18 may exert more resistance to tubing movement in the first tubing cavity 76A and, thus, facilitate securing the pipe fitting 18 to the first pipe segment 20A. On the other hand, the pipe fitting 18 may exert less resistance to tubing movement in the second tubing cavity 76B, which, at least in some instances, may enable the tubing of the second pipe segment 20B to move relatively freely into and/or out from the second tubing cavity 76B of the pipe fitting 18. As such, to facilitate securing the pipe fitting 18 to the second pipe segment 20B, the deployment equipment 66 may be operated to conformally deform (e.g., swage) the second outer jacket 74B around the tubing 22 of the second pipe segment 20B, thereby consuming at least a portion (e.g., majority) of the open space 79.

To facilitate conformally deforming the outer jacket 74 of a pipe fitting 18 around pipe segment tubing 22, as in the depicted example, the deployment equipment 66 may include a grab plate 76, a die plate 78, one or more guide rods 80, and one or more actuators 82. More specifically, in the depicted example, the deployment equipment 66 includes a first actuator 82A, which is coupled to the grab plate 76 via a first guide rod 80A that extends through the die plate 78. Additionally, the deployment equipment 66 includes a second actuator 82B, which is coupled to the grab plate 76 via a second guide rod 80B that extends through the die plate 78. In other words, in some embodiments, the first actuator 82A and/or the second actuator 82B may be operated to selectively push the die plate 78 toward the grab plate 76 and/or to selectively pull the die plate 78 away from the grab plate 76.

Furthermore, as depicted, a die (e.g., one or more die segments or die halves) 84 is disposed in the die plate 78. When compressed against an outer jacket 74 of a pipe fitting 18 in the axial direction, the shape of the die 84 may compress the outer jacket 74 inwardly in a radial direction, for example, such that the outer jacket 74 and pipe segment tubing 22 disposed in a corresponding tubing cavity 76 are conformally deformed. In fact, in some embodiments, different dies 84 may be selectively used in the die plate 78, for example, during successive compression cycles and/or depending on characteristics, such as diameter and/or material thickness, of the outer jacket 74.

To facilitate compressing the die plate 78 and, thus, its die 84 against an outer jacket 74 of the pipe fitting 18, as in the depicted example, the grab plate 76 of the deployment equipment 66 may be secured to the pipe fitting 18 via one or more equipment grab tabs 86, which are each implemented (e.g., sized and/or shaped) to matingly interlock (e.g., interface and/or engage) with a corresponding grab notch 88 on the grab ring 72 of the pipe fitting 18. In other words, returning to the process 60 of FIG. 7, in some embodiments, coupling the pipe fitting 18 to the pipe segment 20 may include coupling deployment equipment 66 to a grab notch 88 on the pipe fitting 18 (process block 90). As described above, the deployment equipment 66 may then force (e.g., push and/or compress) its die plate 78 and, thus, its die 84 toward the grab plate 76, which, at least in some instances, may conformally deform the outer jacket 74 of the pipe fitting 18 and the tubing 22 of a pipe segment 20 disposed in a corresponding tubing cavity and, thus, facilitate securing the pipe fitting to the pipe segment 20.

Additionally, as described above, to facilitate improving operational reliability and/or operational efficiency of a pipeline system 10, one or more pipeline retainer stakes 46 may be deployed at a pipeline component, such as a pipe fitting 18 or a pipe segment 20, in the pipeline system 10 to facilitate offsetting forces, such as parallel forces resulting from deployment at least in part on an inclined surface 40, exerted on the pipeline system 10 (process block 64). In other words, in some embodiments, a pipeline retainer stake 46 may be deployed at a pipe fitting 18, such as a midline pipe fitting 18 and/or a pipe end fitting 18, in the pipeline system 10. Additionally or alternatively, a pipeline retainer stake 46 may be deployed at a pipe segment 20 in the pipeline system 10. In fact, in some embodiments, a pipeline retainer stake 46 to be deployed at a pipe fitting 18 and a pipeline retainer stake 46 to be deployed at a pipe segment 20 may be implemented slightly differently.

Figure 9:
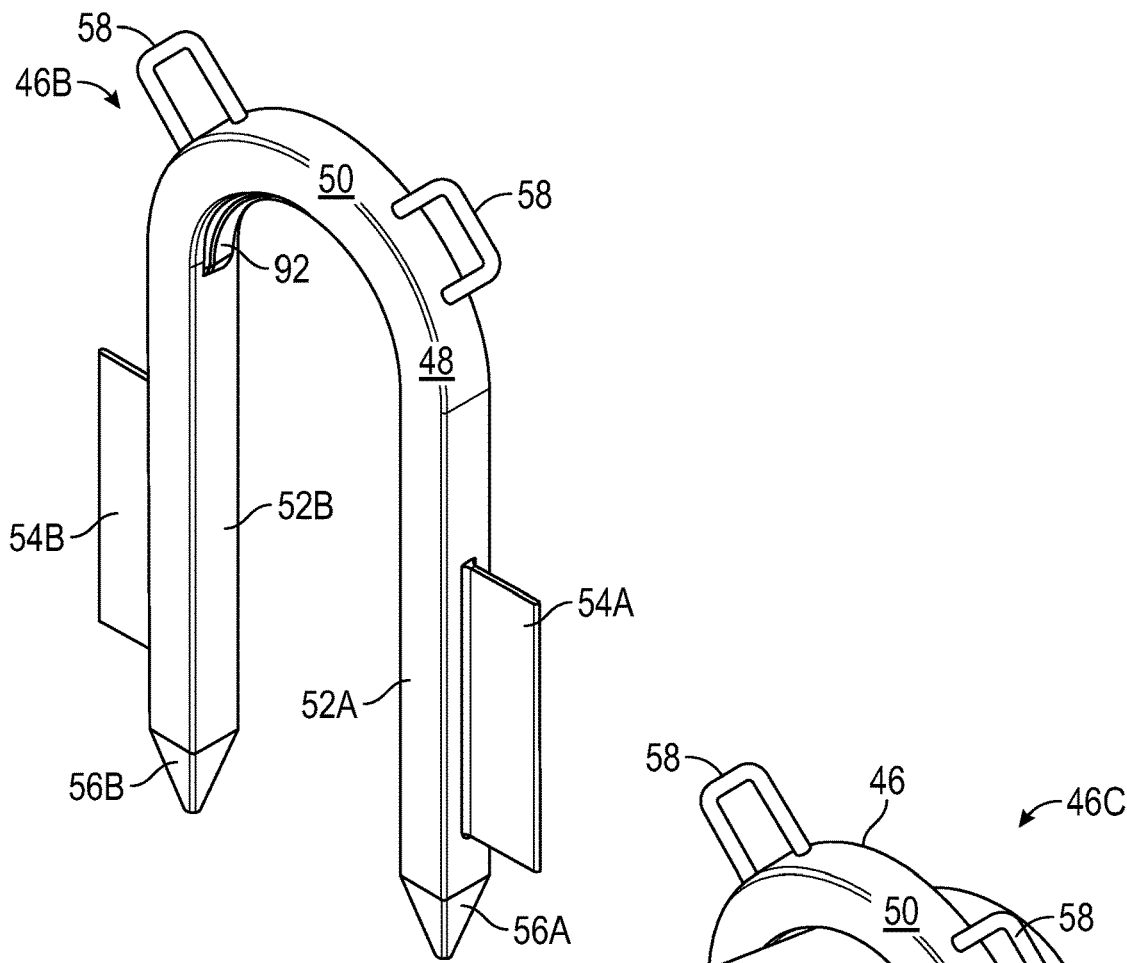
FIG. 9 is a perspective view of an example of the pipeline retainer stake of FIG. 5 that includes a stake grab tab, in accordance with an embodiment of the present disclosure.
Figure 10:
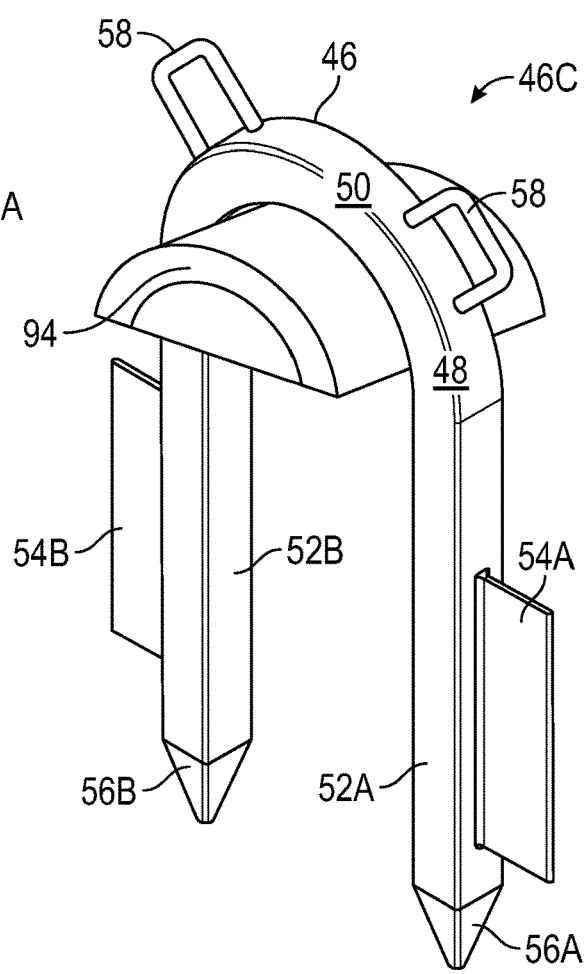
FIG. 10 is a perspective view of an example of a pipeline retainer stake that includes a buffer pad, in accordance with an embodiment of the present disclosure.

To help illustrate, an example of a pipeline retainer stake 46—namely a pipe fitting retainer stake 46B—is shown in FIG. 9 and another example of a pipeline retainer stake 46—namely a pipe fitting retainer stake 46C—is shown in FIG. 10. However, it should be appreciated that the depicted examples are merely intended to be illustrative and not limiting. For example, in other embodiments, the pipeline retainer stake 46 of FIG. 9 may additionally or alternatively be deployed at a pipe segment 20. Furthermore, in other embodiments, the pipeline retainer stake 46 of FIG. 10 may additionally or alternatively be deployed at a pipe fitting 18.

In any case, as depicted, the pipe fitting retainer stake 46B of FIG. 9 and the pipe segment retainer stake 46C of FIG. 10 each includes a U-shaped stake body 48. As described above, in such embodiments, the pipeline engaging portion of a stake body 48 may include the curved (e.g., semi-circular) portion 50 of the stake body 48. Additionally, as described above, in such embodiments, the environment (e.g., ground) engaging portion of a stake body 48 may include the stake legs 52—namely a first stake leg 52A and a second stake leg 52B—that extend from the curved portion 50 of the stake body 48.

Furthermore, as depicted, the pipe fitting retainer stake 46B of FIG. 9 and the pipe segment retainer stake 46C of FIG. 10 each includes a first pointed (e.g., sharpened) end 56A on its first stake leg 52A and a first wing plate 54A, which is coupled to and/or integrated with its first stake leg 52A. As depicted, the pipe fitting retainer stake 46B of FIG. 9 and the pipe segment retainer stake 46C of FIG. 10 each also includes a second pointed end 56B on its second stake leg 52B and a second wing plate 54B, which is coupled to and/or integrated with its second stake leg 52B. Moreover, as depicted, the pipe fitting retainer stake 46B of FIG. 9 and the pipe segment retainer stake 46C of FIG. 10 each includes handles 58 coupled to and/or integrated with its stake body 48.

However, as depicted in FIG. 9, the pipe fitting retainer stake 46B includes a stake grab tab 92 implemented along an inner surface of its stake body 48 whereas, as depicted in FIG. 10, the pipe segment retainer stake 46C includes a buffer pad 94 implemented along an inner surface of its stake body 48. As will be described in more detail below, in some embodiments, the buffer pad 94 of the pipe segment retainer stake 46C may be implemented with a material, such as a plastic and/or rubber, that is softer than the base material of its stake body 48, for example, to facilitate reducing the likelihood that rubbing between the pipe segment retainer stake 46C against tubing 22 of a pipe segment 20 affects (e.g., reduces and/or compromises) integrity of the pipe segment 20. Additionally, as described above, a pipe fitting 18 may include a grab notch 88, which is implemented to matingly interlock (e.g., interface and/or engage) with an equipment grab tab 86 of deployment equipment 66 that is operated to facilitate securing the pipe fitting 18 to a pipe segment 20.

Figure 11:
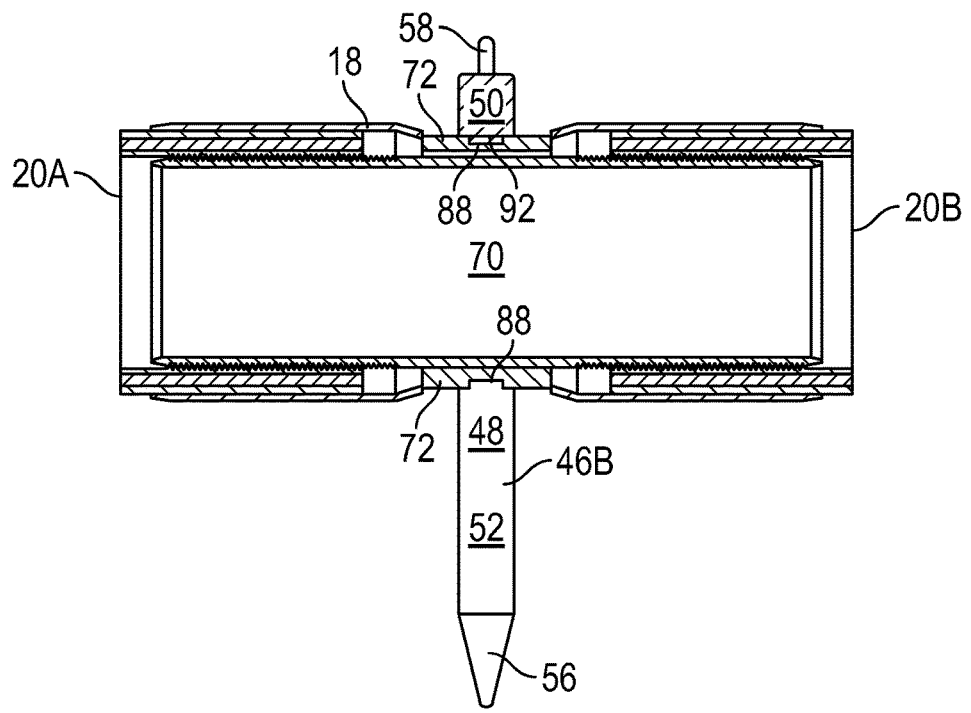
FIG. 11 is a side cross-sectional view of an example of the pipeline retainer stake of FIG. 9 coupled to a portion of a pipeline system that includes a pipe fitting, in accordance with an embodiment of the present disclosure.

Leveraging this fact, to facilitate securing the pipe fitting retainer stake 46B to a pipe fitting 18, the stake grab tab 92 on the pipe fitting retainer stake 46B may be implemented (e.g., sized and/or shaped) to matingly interlock (e.g., interface and/or engage) with a corresponding grab notch 88 on the pipe fitting 18. To help illustrate, an example cross-section of a pipe fitting retainer stake 46B deployed at a pipe fitting 18 is shown in FIG. 11. As depicted, the pipe fitting 18 is secured between a first pipe segment 20A and a second pipe segment 20B. In other words, the pipe fitting 18 in FIG. 11 may be a midline pipe fitting 18.

However, it should be appreciated that the depicted example is merely intended to be illustrative and not limiting. In particular, in other embodiments, the techniques described in the present disclosure may additionally or alternatively be used with a pipe end fitting 18. Furthermore, in other embodiments, a pipe fitting retainer stake 46B may additionally or alternatively not include a handle 58.

In any case, as depicted, the pipe fitting retainer stake 46B includes a stake grab tab 92 implemented along an inner surface of the curved (e.g., pipeline engaging) portion 50 of its stake body 48. Additionally, as depicted, when the pipe fitting retainer stake 46B is deployed at the pipe fitting 18, the stake grab tab 92 matingly interlocks with at least a portion of a grab notch 88 on the grab ring 72 of the pipe fitting 18, for example, such that one or more stake legs 52 and, thus, corresponding pointed ends 56 extend beyond the outer surface of the pipe fitting 18 to engage the environment (e.g., ground) external (e.g., adjacent and/or proximate) to the pipe fitting 18. As such, at least in some instances, deploying a pipe fitting retainer stake 46B at a pipe fitting 18 in this manner may facilitate improving the ability of the pipe fitting retainer stake 46B to offset force, such as a parallel force resulting from deployment on an inclined surface 40, exerted on the pipe fitting 18 in an axial direction, for example, in addition to force exerted on the pipe fitting 18 in a radial direction and/or in a circumferential direction.

Thus, returning to the process 60 of FIG. 6, in some embodiments, deploying a pipeline retainer stake 46, such as a pipe fitting retainer stake 46B, at a pipe fitting 18 may include sliding the pipeline retainer stake 46 onto the pipe fitting 18 such that a stake grab tab 92 on the pipeline retainer stake 46 matingly interlocks with a grab notch 88 on the pipe fitting 18 (process block 96). As described above, deploying the pipeline retainer stake 46 in this manner may result in one or more stake legs 52 (e.g., in addition to corresponding wing plates 54) being inserted into and, thus, engaging the environment (e.g., ground) external (e.g., adjacent and/or proximate) to the pipe fitting 18, which, at least in some instances, may facilitate transferring force exerted on the pipe fitting 18 to the external environment and, thus, offsetting the force. Furthermore, as described above, in some embodiments, one or more pipe segment retainer stakes 46C may additionally or alternatively be deployed in a pipeline system 10. In other words, in such embodiments, coupling the pipeline retainer stake 46 to a pipeline component may include coupling a pipe segment retainer stake 46C around the tubing 22 of a pipe segment 20 (process block 98).

Figure 12:
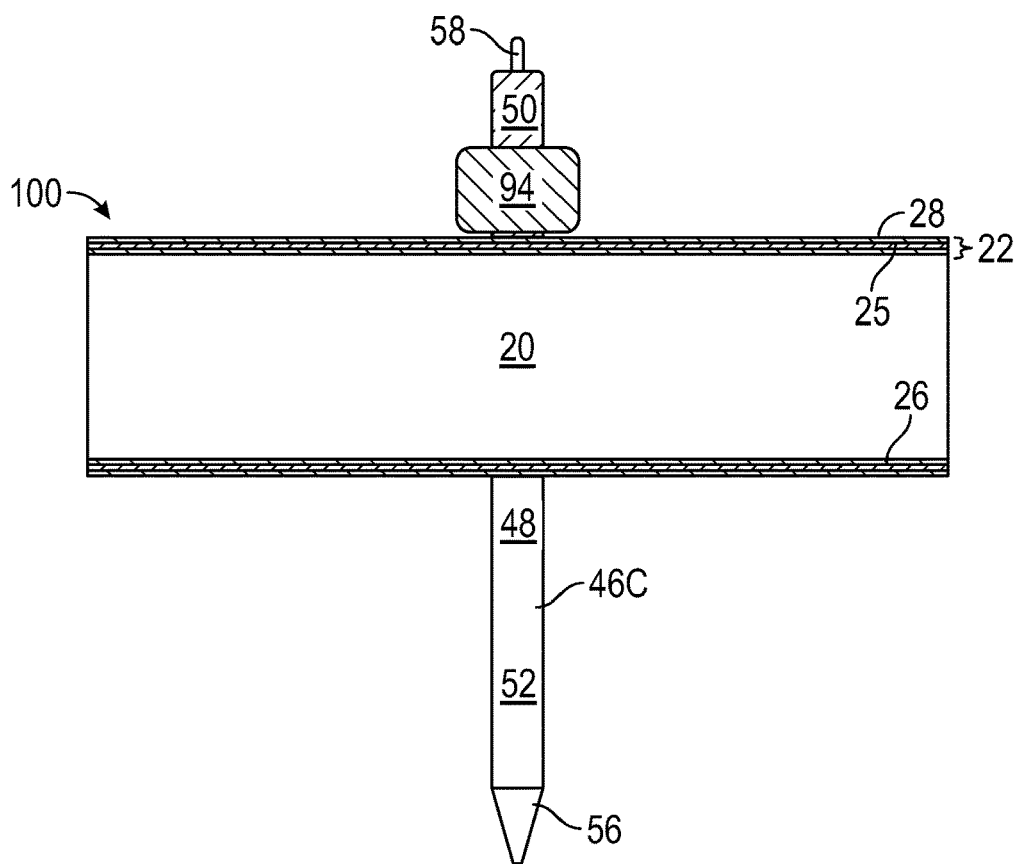
FIG. 12 is side cross-sectional view of an example of the pipeline retainer stake of FIG. 10 coupled to a pipe segment, in accordance with an embodiment of the present disclosure.

To help illustrate, an example cross-section of a pipe segment retainer stake 46C deployed at a pipe segment 20 is shown in FIG. 12. As depicted, the tubing 22 of the pipe segment 20 includes at least an outer layer 28. As in the depicted example, in some embodiments, the pipe segment tubing 22 may additionally include an inner layer 26 and a tubing annulus 25, for example, which includes one or more intermediate layers 34.

However, it should be appreciated that the depicted example is merely intended to be illustrative and not limiting. In particular, in other embodiments, the tubing 22 of a pipe segment 20 may include a single layer, which may thus be the outer layer 28 of the pipe segment tubing 22. Additionally or alternatively, in other embodiments, the pipe segment retainer stake 46C may not include a handle 58.

In any case, as depicted, the pipe segment retainer stake 46C includes a buffer pad 94 implemented along an inner surface of the curved (e.g., pipeline engaging) portion 50 of its stake body 48. Additionally, as depicted, when the pipe segment retainer stake 46C is deployed at the pipe segment 20, the buffer pad 94 is in contact (e.g., engaged) with at least a portion of an outer surface 100 of the outer tubing layer 28, for example, such that one or more stake legs 52 and, thus, corresponding pointed (e.g., sharpened) ends 56 extend beyond the outer surface 100 of the outer tubing layer 28 to engage the environment, such as ground, external (e.g., adjacent and/or proximate) to the pipe segment 20. As described above, in some embodiments, the buffer pad 94 may be implemented using a softer material than the base material of the stake body 48, which, at least in some instances, may facilitate reducing the likelihood that rubbing between the pipe segment retainer stake 46C and tubing 22 of a pipe segment 20 produces a defect, such as a breach, that compromises integrity of the pipe segment 20. Merely as an illustrative non-limiting example, the base material of the stake body 48 may be metal while the buffer pad 94 is made of rubber and/or plastic.

In fact, in some embodiments, the pipe segment retainer stake 46C may be implemented and/or deployed such that its stake body 48 itself does not directly contact the pipe segment tubing 22. In other words, in such embodiments, the buffer pad 94, which is implemented along the inner surface of the pipeline engaging (e.g., curved) portion of the stake body 48, may directly contact the pipe segment tubing 22 while the pipeline engaging portion of the stake body 48 itself does not. Thus, in such embodiments, the contact (e.g., engagement) between the buffer pad 94 of a pipe segment retainer stake 46C, which is deployed at a pipe segment 20 in this manner, may facilitate offsetting force, such as a parallel force resulting from deployment on an inclined surface 40, exerted on the pipe segment 20, for example, in an axial direction, a radial direction, and/or a circumferential direction. In fact, to facilitate improving the ability of the pipe segment retainer stake 46C to offset force exerted on the pipe segment 20, in some embodiments, the buffer pad of the pipe segment retainer stake 46C may be implemented and/or coated with a material that has a higher coefficient of friction than the base material of its stake body 48.

Figure 13:
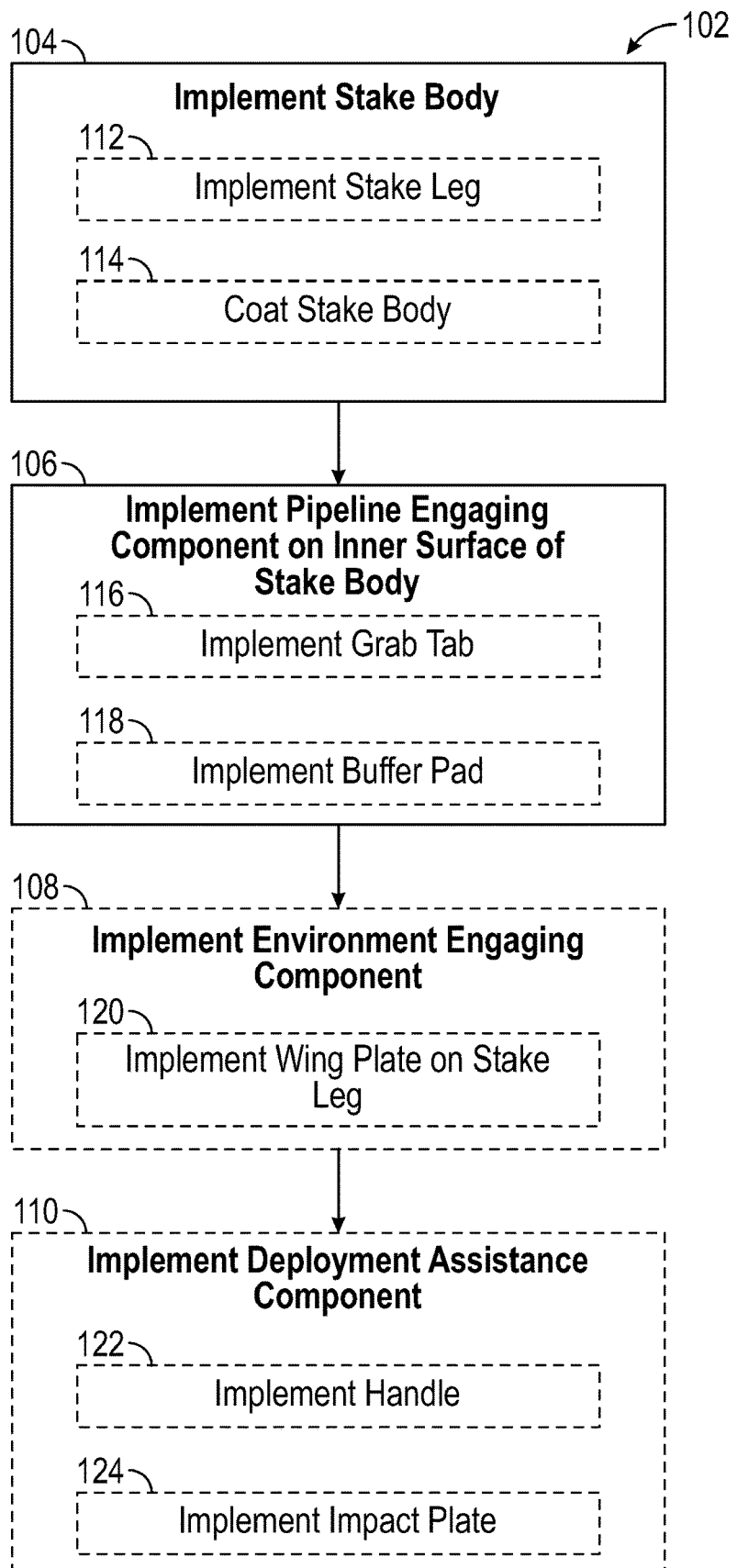
FIG. 13 is flow diagram of an example process for implementing (e.g., manufacturing) a pipeline retainer stake, in accordance with an embodiment of the present disclosure.

To help further illustrate, an example of a process 102 for implementing a pipeline retainer stake 46, such as a pipe fitting retainer stake 46B or a pipe segment retainer stake 46C, is described in FIG. 13. Generally, the process 102 includes implementing a stake body (process block 104). Additionally, the process 102 generally includes implementing a pipeline engaging component on an inner surface of the stake body (process block 106).

Although described in a specific order, which corresponds with an embodiment of the present disclosure, it should be appreciated that the example process 102 is merely intended to be illustrative and non-limiting. In particular, in other embodiments, a process 102 for implementing a pipeline retainer stake 46 may include one or more additional process blocks and/or omit one or more of the depicted process blocks. For example, some embodiments of the process 102 may additionally include implementing an environment (e.g., ground) engaging component (process block 108) while other embodiments of the process 102 do not. Furthermore, some embodiments of the process 102 may additionally include implementing a deployment assistance component (process block 110) while other embodiments of the process 102 do not.

In any case, as described above, a pipeline retainer stake 46 generally includes a stake body 48. Thus, implementing the pipeline retainer stake 46 may include implementing its stake body 48 (process block 104). As described above, in some embodiments, the stake body 48 of a pipeline retainer stake 46 may be implemented with a U-shape. Thus, in some such embodiments, the stake body 48 may be implemented at least in part by bending a bar of material, such as metal. Additionally or alternatively, the stake body 48 may be milled from a block of metal.

Furthermore, as described above, in some embodiments, the stake body 48 of a pipeline retainer stake 46 may include a pipeline engaging portion, such as the curved (e.g., semi-circular) portion 50 of a U-shaped stake body 48, and an environment engaging portion, which includes one or more stakes legs 52 of the stake body 48. Thus, in such embodiments, implementing the stake body 48 may include implementing one or more stake legs 52, for example, in addition to a pipeline engaging portion (process block 112). As described above, to facilitate insertion into the environment (e.g., ground) external to a pipeline component, in some embodiments, one or more stake legs 52 of the pipeline retainer stake 46 may include a pointed (e.g., sharpened) end 56. In other words, in such embodiments, implementing a stake leg 52 of the pipeline retainer stake 46 may include selectively removing (e.g., milling) material from an end of the stake body 48 to form a point.

Moreover, in some embodiments, the stake body 48 or the pipeline retainer stake 46 as a whole may be coated, for example, with a material different from the base material of the stake body 48 (process block 114). Merely as an illustrative non-limiting, to facilitate improving its ability to offset exerted forces, the pipeline retainer stake 46 may be coated with a material that has a higher coefficient of friction than the base material of its stake body 48. Additionally or alternatively, to facilitate improving its lifespan, the pipeline retainer stake 46 may be coated with a material that is more corrosion resistant than the base material of its stake body 48.

Implementing the pipeline retainer stake 46 may additionally include implementing one or more pipeline engaging components along an inner surface of its stake body 48 (process block 106). As described above, in some embodiments, a pipeline retainer stake 46, such as a pipe fitting retainer stake 46B, may include a pipeline engaging component—namely a stake grab tab 92—implemented along the inner surface of its stake body 48. In other words, in such embodiments, implementing the pipeline engaging component of the pipeline retainer stake 46 may include implementing a stake grab tab 92 along the inner surface of its stake body 48 (process block 116). For example, in some embodiments, the stake grab tab 92 may be implemented at least in part by selectively removing (e.g., milling) material from the inner surface of the pipeline engaging (e.g., curved) portion of the stake body 48 to form a protrusion that is shaped and/or sized to matingly interlock with a grab notch 88 on a pipe fitting 18. In other words, in such embodiments, the stake grab tab 92 may be integrated with the stake body 48 and, thus, implemented using the same material as the base material of the stake body 48

In other embodiments, the stake grab tab 92 of the pipeline retainer stake 46 may be initially implemented as a discrete component. For example, in some such embodiments, the stake grab tab 92 may initially be a discrete piece of material, which is shaped and/or sized to matingly interlock with a grab notch 88 on a pipe fitting 18, that is then coupled (e.g., welded) to the pipeline engaging (e.g., curved) portion of the stake body 48 to form a protrusion. In fact, in some such embodiments, implementing the stake grab tab 92 in this manner may enable the stake grab tab 92 to be implemented with a material that is different from the base material of the stake body 48. In other such embodiments, the stake grab tab 92 may nevertheless be implemented using the same material as the base material of the stake body 48.

Additionally, as described above, in some embodiments, a pipeline retainer stake 46, such as a pipe segment retainer stake 46C, may include a pipeline engaging component—namely a buffer pad—implemented along the inner surface of its stake body 48. In other words, in such embodiments, implementing the pipeline engaging component of the pipeline retainer stake 46 may include implementing a buffer pad 94 along the inner surface of its stake body 48 (process block 118). As described above, to facilitate reducing the likelihood that rubbing between the pipeline retainer stake 46 and the tubing 22 of a pipe segment 20 affects (e.g., reduces and/or compromises) integrity of the pipe segment 20, in some embodiments, the buffer pad 94 may be implemented with a softer material, such as rubber or plastic, compared to the base material of the stake body 48. In other words, in such embodiments, the buffer pad 94 may initially be a discrete component and, thus, coupled (e.g., glued) to the pipeline engaging (e.g., curved) portion of the stake body 48.

Moreover, to facilitate further reducing the likelihood that rubbing between the pipeline retainer stake 46 and the tubing 22 of a pipe segment 20 affects integrity of the pipe segment 20, in some embodiments, the buffer pad 94 may be implemented such that the stake body 48 is not expected to directly contact the pipe segment tubing 22. For example, as in the pipe segment retainer stake 46C of FIG. 10, the buffer pad 94 may be implemented to extend along the length (e.g., circumferential extent) of the curved (e.g., pipeline engaging) portion 50 of the stake body 48. Additionally or alternatively, as in the pipe segment retainer stake 46C of FIG. 10 and the pipe segment retainer stake 46C of FIG. 12, the buffer pad 94 may be implemented to extend beyond the width (e.g., axial extent) of the stake body 48.

Returning to the process 102 of FIG. 13, as described above, in some embodiments, the pipeline retainer stake 46 may be implemented at least in part by implementing one or more environment engaging components (process block 108). In particular, as described above, in some embodiments, an environment engaging component of a pipeline retainer stake 46 may include a wing plate 54 coupled to and/or integrated with a stake leg 52 of its stake body 48. In other words, in such embodiments, implementing an environment engaging component of the pipeline retainer stake 46 may include implementing one or more wing plates 54 on a stake leg 52 of the pipeline retainer stake 46 (process block 120).

In some embodiments, a wing plate 54 of the pipeline retainer stake 46 may be initially implemented as a discrete component. Thus, in such embodiments, the pipeline retainer stake 46 may be implemented at least in part by coupling (e.g., welding) the wing plate 54 to a stake leg 54 of its stake body 48. Additionally or alternatively, a wing plate 54 of the pipeline retainer stake 46 may be integrated with its stake body 48, for example, by milling the stake body 48 as well the wing plate 54 from a single block of metal.

Furthermore, as described above, in some embodiments, the pipeline retainer stake 46 may be implemented at least in part by implementing one or more deployment assistance components (process block 110). In particular, as described above, in some such embodiments, a deployment assistance component a pipeline retainer stake 46 may include a handle 48 coupled to and/or integrated its stake body 48. In other words, in such embodiments, implementing a deployment assistance component of the pipeline retainer stake 46 may include implementing one or more handle 58 on the pipeline retainer stake 46 (process block 122).

In some embodiments, a handle 58 of the pipeline retainer stake 46 may be initially implemented as a discrete component. Thus, in such embodiments, the pipeline retainer stake 46 may be implemented at least in part by coupling (e.g., welding) the handle 58 to its stake body 48. Additionally or alternatively, a handle 58 of the pipeline retainer stake 46 may be integrated with its stake body 48, for example, by milling the stake body 48 as well the handle 58 from a single block of metal.

As briefly mentioned above, in some embodiments, deployment assistance components a pipeline retainer stake 46 may additionally or alternatively include an impact plate. In other words, in such embodiments, implementing a deployment assistance component of the pipeline retainer stake 46 may include implementing one or more impact plates on the pipeline retainer stake 46 (process block 124). In particular, in some embodiments, an impact plate of the pipeline retainer stake 46 may be implemented to facilitate deploying the pipeline retainer stake 46 on a pipeline component, such as a pipe fitting 18 and/or a pipe segment 20, while reducing the likelihood of deployment equipment, such as a sledge hammer, inadvertently contacting the pipeline component while the pipeline retainer stake 46 is being deployed.

Figure 14:
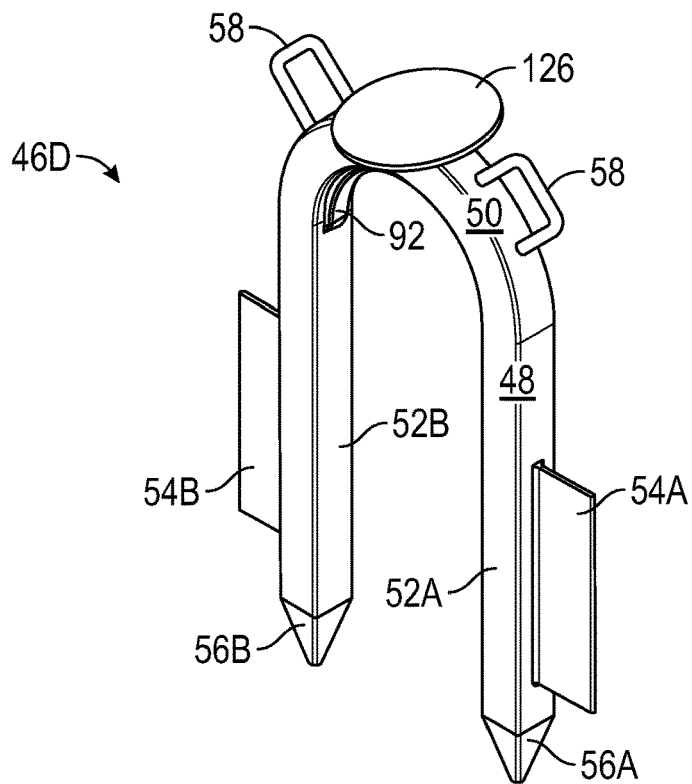
FIG. 14 is a perspective view of an example of a pipeline retainer stake that includes an impact plate, in accordance with an embodiment of the present disclosure.

To help illustrate, an example of a pipeline retainer stake 46D, which includes an impact plate 126, is shown in FIG. 14. As depicted, the pipeline retainer stake 46D additionally includes a stake grab tab 92 implemented along an inner surface of its stake body 48. In other words, in some embodiments, the pipeline retainer stake 46D may be a pipe fitting retainer stake 46B.

However, it should be appreciated that the depicted example is merely intended to be illustrative and not limiting. In particular, in other embodiments, an impact plate 126 may additionally or alternatively be implemented on a pipe segment retainer stake 46D, for example, which includes a buffer pad 94 implemented along an inner surface of its stake body 48. Furthermore, in other embodiments, a pipeline retainer stake 46 may include multiple impact plates 126, for example, with a first impact plate 126 that extends from a first (e.g., left or front) side of the pipeline retainer stake 46 and a second impact plate 126 that extends from a second (e.g., right, back, or opposite) side of the pipeline retainer stake 46.

In any case, as depicted, the impact plate 126 of the pipeline retainer stake 46D is implemented on an outer surface of the curved (e.g., pipeline engaging) portion 50 of its stake body 48. In some embodiments, the impact plate 126 may be initially implemented as a discrete component. Thus, in such embodiments, the pipeline retainer stake 46D may be implemented at least in part by coupling (e.g., welding) the impact plate 126 to its stake body 48. Additionally or alternatively, the impact plate 126 may be integrated with the stake body 48 of the pipeline retainer stake 46D, for example, by milling the stake body 48 as well the impact plate 126 from a single block of metal.

As described above, a pipeline retainer stake 46 may be deployed at a pipeline component, such as a pipe fitting 18 or a pipe segment 20, at least in part by inserting one or more of its stake legs 52 into the environment, such as ground, external (e.g., adjacent and/or proximate) to the pipeline component. Thus, to facilitate deploying the pipeline retainer stake 46, at least in some instances, deployment equipment, such as a sledge hammer, may be used to exert force against the pipeline retainer stake 46. However, at least in some instances, inadvertently contacting (e.g., striking) the pipeline component with the deployment equipment may affect (e.g., reduce and/or compromise) integrity of the pipeline component, for example, due to the inadvertent contact resulting in a defect, such as a breach or a dent, on the pipeline component.

To facilitate reducing the likelihood of deployment equipment inadvertently contacting a pipeline component at which the pipeline retainer stake 46D is being deployed, as depicted, the impact plate 126 extends beyond the width (e.g., axial extent) of the stake body 48. In other words, implementing the impact plate 126 in this manner may facilitate providing the deployment equipment a larger (e.g., longer and/or wider) surface with which to exert force on the pipeline retainer stake 46D. Additionally or alternatively, implementing the impact plate 126 in this manner may facilitate blocking the deployment equipment from inadvertently contacting a pipeline component, such as a pipe fitting 18 or a pipe segment 20, at which the pipeline retainer stake 46D is being deployed.

Figure 15:
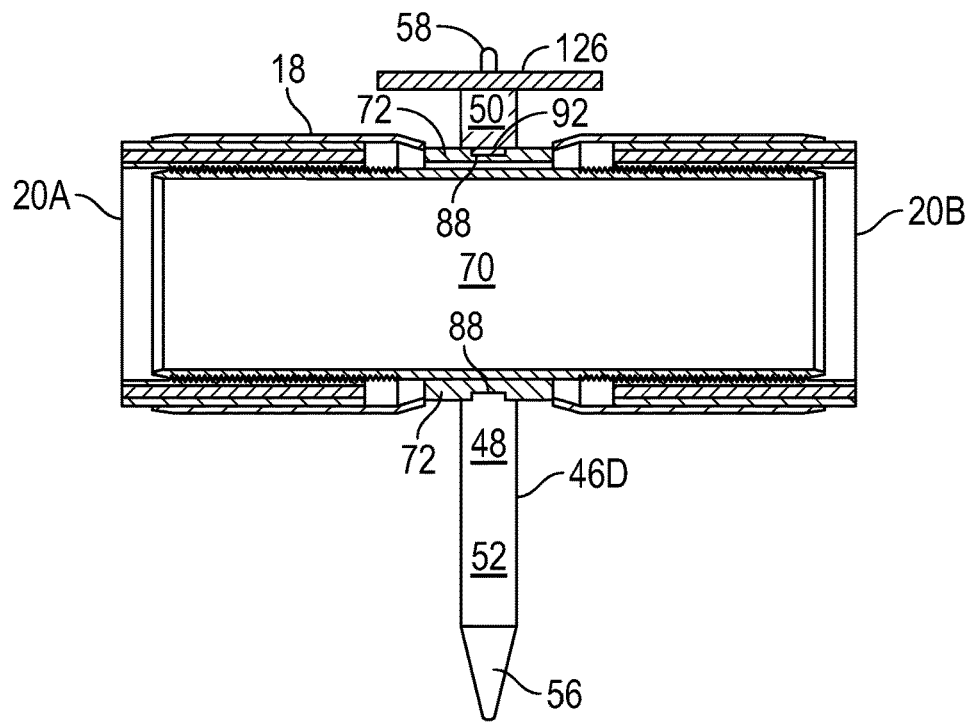
FIG. 15 is a side cross-sectional view of an example of the pipeline retainer stake of FIG. 14 coupled to a portion of a pipeline system that includes a pipe fitting, in accordance with an embodiment of the present disclosure.

To help illustrate, an example cross-section of a pipeline retainer stake 46D, which includes an impact plate 126, deployed at a pipe fitting 18 is shown in FIG. 15. As depicted, the pipe fitting 18 is secured between a first pipe segment 20A and a second pipe segment 20B. In other words, the pipe fitting 18 in FIG. 15 may be a midline pipe fitting 18.

However, it should be appreciated that the depicted example is merely intended to be illustrative and not limiting. In particular, in other embodiments, the techniques described in the present disclosure may additionally or alternatively be used with a pipe end fitting 18. Furthermore, in other embodiments, the pipeline retainer stake 46D may additionally or alternatively not include a handle 58. Moreover, in other embodiments, the pipeline retainer stake 46D may additionally or alternatively be deployed at a pipe segment 20.

In any case, as depicted, the impact plate 126 on the pipeline retainer stake 46D extends beyond the axial extent (e.g., width) of its stake body 48 and, thus, enables the pipeline retainer stake 46D to cover more of the pipe fitting 18 than the stake body 48 alone. In other words, implementing the impact plate 126 in this manner may facilitate increasing the size of a surface at which deployment equipment, such as a sledge hammer, can exert force on the pipeline retainer stake 46D and/or the amount of the pipe fitting 18 that is blocked from being inadvertently contacted by the deployment equipment. Additionally, as depicted, when the pipeline retainer stake 46 is deployed, one or more stake legs 52 and, thus, corresponding pointed ends 56 extend beyond the outer surface of the pipe fitting 18 to engage the environment (e.g., ground) external (e.g., adjacent and/or proximate) to the pipe fitting 18. As described above, deploying a pipeline retainer stake 46 at a pipeline component in this manner may facilitate transferring forces, such as a parallel force resulting from deployment on an inclined surface 40, exerted on the pipeline component to its external environment (e.g., the ground) and, thus, offsetting the forces, which, at least in some instances, may facilitate improving operational reliability and/or operational efficiency of a pipeline system 10, for example, at least in part by distributing the forces more evenly between pipeline components and/or reducing the likelihood that the forces cause the pipeline system 10 to move.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A pipeline system comprising:
   a pipe fitting configured to be secured to a pipe segment, wherein the pipe fitting comprises a grab notch; and
   a pipeline retainer stake, wherein the pipeline retainer stake comprises:
     a stake body, wherein the stake body comprises:
       a pipeline engaging portion; and
       one or more stake legs that extend out form the pipeline engaging portion, wherein the one or more stake legs are configured to engage ground proximate to the pipe fitting; and
     a stake grab tab that protrudes from an inner surface of the pipeline engaging portion of the stake body, wherein the stake grab tab is configured to matingly interlock with at least a portion of the grab notch on the pipe fitting to enable the pipeline retainer stake to facilitate offsetting a parallel force resulting from deployment of the pipeline system on an inclined surface at least in part by transferring the parallel force from the pipe fitting to the ground proximate to the pipe fitting.

2. The pipeline system of claim 1, wherein the one or more stake legs of the stake body are integrated with the pipeline engaging portion of the stake body.

3. The pipeline system of claim 1, wherein the stake body of the pipeline retainer stake comprises a U-shaped stake body, wherein:
the pipeline engaging portion of the stake body comprises a curved portion of the U-shaped stake body; and
the one or more stake legs of the stake body comprise:
a first stake leg that extends out from the curved portion of the U-shaped stake body; and
a second stake leg that extends out from the curved portion of the U-shaped stake body.

4. The pipeline system of claim 1, wherein the pipeline retainer stake comprises:
a first wing plate secured to a first stake leg of the stake body such that the first wing plate is configured to extend away from the pipe fitting; and
a second wing plate secured to a second stake leg of the stake body such that the wing plate is configured to extend away from the pipe fitting.

5. The pipeline system of claim 1, wherein:
the grab notch on the pipe fitting is configured to interlock with an equipment grab tab on deployment equipment that operates to facilitate securing the pipe fitting to the pipe segment; and
the stake grab tab is configured to matingly interlock with at least the portion of the grab notch on the pipe fitting after the deployment equipment is disconnected from the pipe fitting.

6. The pipeline system of claim 1, wherein the pipeline retainer stake comprises an impact plate secured to the stake body such that the impact plate that extends beyond the stake body, wherein the impact plate is configured to facilitate deploying the pipeline retainer stake at the pipe fitting at least in part by enabling deployment equipment to exert force on the pipeline retainer stake while reducing likelihood of the deployment equipment inadvertently contacting the pipe fitting, the pipe segment secured to the pipe fitting, or both.

7. The pipeline system of claim 1, wherein the pipeline retainer stake comprises a handle secured to the stake body such that the handle that extends out from the stake body, wherein the handle is configured to facilitate moving the pipeline retainer stake to the pipe fitting, removing the pipeline retainer stake from the pipe fitting, or both.

8. A method of implementing a pipeline retainer stake, comprising:
implementing a stake body of the pipeline retainer stake at least in part by:
implementing a pipeline engaging portion; and
implementing one or more stake legs that extend out from the pipeline engaging portion to enable the one or more stake legs to engage ground proximate to a pipe fitting in a pipeline system that is secured to a pipe segment in the pipeline system; and
implementing a stake grab tab that protrudes out from an inner surface of the pipeline engaging portion of the stake body to enable the stake grab tab to matingly interlock with a grab notch on the pipe fitting to facilitate offsetting a force exerted on the pipe fitting at least in part by transferring the force from the pipe fitting to the ground proximate to the pipe fitting.

9. The method of claim 8, wherein implementing the stake body comprises implementing the one or more stake legs such that the one or more stake legs are integrated with the pipeline engaging portion of the stake body.

10. The method of claim 8, wherein:
implementing the pipeline engaging portion of the stake body comprise implementing a curved portion of a U-shaped stake body; and
implementing the one or more stake legs comprises:
implementing a first stake leg that extends out from the curved portion of the U-shaped stake body; and
implementing a second stake leg that extend out from the curved portion of the U-shaped stake body.

11. The method of claim 8, wherein implementing the stake body comprises bending a bar of metal.

12. The method of claim 8, comprising:
securing a first plurality of wing plates to a first stake leg of the stake body to enable the first plurality of wing plates to engage the ground proximate to the pipe fitting; and
securing a second plurality of wing plates to a second stake leg of the stake body to enable the second plurality of wing plates to engage the ground proximate to the pipe fitting.

13. The method of claim 8, comprising securing an impact plate to the stake body such that the impact plate extends beyond the stake body to facilitate deploying the pipeline retainer stake at the pipe fitting at least in part by enabling deployment equipment to exert force on the pipeline retainer stake while reducing likelihood of the deployment equipment inadvertently contacting the pipe fitting, the pipe segment secured to the pipe fitting, or both.

14. The method of claim 8, comprising securing a handle to the stake body such that the handle extends out from the stake body to facilitate moving the pipeline retainer stake to the pipe fitting, removing the pipeline retainer stake from the pipe fitting, or both.

* * * * *